(12) United States Patent
Harrison

(10) Patent No.: US 11,672,213 B2
(45) Date of Patent: Jun. 13, 2023

(54) HYDROPONIC SYSTEM

(71) Applicant: Todd Adam Dennis Harrison, Sydney (AU)

(72) Inventor: Todd Adam Dennis Harrison, Sydney (AU)

( * ) Notice: Subject to any disclaimer, the term of this patent is extended or adjusted under 35 U.S.C. 154(b) by 256 days.

(21) Appl. No.: 16/763,935

(22) PCT Filed: Nov. 20, 2018

(86) PCT No.: PCT/EP2018/081977
§ 371 (c)(1),
(2) Date: May 13, 2020

(87) PCT Pub. No.: WO2019/101755
PCT Pub. Date: May 31, 2019

(65) Prior Publication Data
US 2020/0390045 A1 Dec. 17, 2020

(30) Foreign Application Priority Data
Nov. 21, 2017 (GB) .................................... 1719306

(51) Int. Cl.
*A01G 31/02* (2006.01)
*A01G 31/00* (2018.01)

(52) U.S. Cl.
CPC ........ *A01G 31/02* (2013.01); *A01G 2031/006* (2013.01)

(58) Field of Classification Search
CPC ... A01G 31/02; A01G 2031/006; A01G 9/247
See application file for complete search history.

(56) References Cited

U.S. PATENT DOCUMENTS 4,079,547 A * 3/1978 Walker .................. A01G 31/02
47/21.1
4,118,891 A * 10/1978 Kehl ...................... A01G 31/02
47/62 C (Continued)

FOREIGN PATENT DOCUMENTS

| CN | 1242667 C | 2/2006 |
|---|---|---|
| CN | 105794712 A | 7/2016 |
| JP | 2007306895 A | 11/2007 |

OTHER PUBLICATIONS

Medelec, Morgan, "International Search Report and Written Opinion Regarding International Application No. PCT/EP2018/081977", dated Apr. 4, 2019, p. 11, Published in: EP.

*Primary Examiner* — Magdalena Topolski
*Assistant Examiner* — Edgar Reyes
(74) *Attorney, Agent, or Firm* — Neugeboren O'Dowd PC

(57) ABSTRACT

A hydroponic system is provided. The system includes a grow assembly. The grow assembly includes a body including at least one aperture, and a porous layer. The system may include a support to support the grow assembly. The system includes a fluid table that may be disposed underneath the body. The system includes a fluid reservoir that may be disposed underneath the fluid table. The system may include a fluid pump in fluid communication with the fluid reservoir. The system includes a fluid riser in fluid communication with the fluid reservoir and the fluid table. A method for utilising a hydroponic system is also provided.

14 Claims, 14 Drawing Sheets

(56) References Cited

U.S. PATENT DOCUMENTS

| | | | | |
|---|---|---|---|---|
| 4,149,340 A * | 4/1979 | Davitoria-Lobo | A01G 31/02 | 47/79 |
| 4,287,682 A * | 9/1981 | Browne | A01G 27/04 | 47/72 |
| 4,291,499 A * | 9/1981 | Prewer | A01G 31/02 | 47/84 |
| 4,299,056 A * | 11/1981 | Towning | A01G 27/04 | 47/81 |
| 4,392,327 A * | 7/1983 | Sanders | A01G 31/02 | 47/81 |
| 4,926,587 A * | 5/1990 | van Wingerden | A01G 9/086 | 47/87 |
| 5,193,306 A * | 3/1993 | Whisenant | A01G 13/0237 | 47/62 R |
| 5,419,080 A * | 5/1995 | Buss | A01G 9/0295 | 47/87 |
| 5,533,302 A * | 7/1996 | Lynch | A01G 9/023 | 47/66.5 |
| 5,555,675 A * | 9/1996 | Whisenant | A01G 9/12 | 47/79 |
| 5,683,770 A * | 11/1997 | Weder | B44C 3/04 | 428/34.1 |
| 5,826,374 A * | 10/1998 | Baca | A01G 31/02 | 47/60 |
| 6,035,578 A * | 3/2000 | Lo | A01G 31/02 | 47/61 |
| 6,061,957 A * | 5/2000 | Takashima | A01G 22/15 | 47/60 |
| 6,401,387 B1 * | 6/2002 | Diloreto | A01G 9/0295 | 47/66.5 |
| 6,431,460 B1 * | 8/2002 | Lo | A01G 31/02 | 119/312 |
| 6,907,693 B1 * | 6/2005 | Bemben | A01G 9/00 | 47/65 |
| 6,951,076 B2 * | 10/2005 | Winsbury | A01G 31/02 | 47/62 R |
| 7,207,138 B1 * | 4/2007 | Hauser | A01G 27/005 | 47/79 |
| 7,658,034 B1 * | 2/2010 | Dickson | A01G 9/02 | 47/66.1 |
| 8,578,651 B1 * | 11/2013 | Giacomantonio | A01G 9/022 | 47/62 A |
| 9,144,206 B1 * | 9/2015 | Rubanenko | A01G 31/02 | |
| 9,532,517 B2 | 1/2017 | Karbowski | | |
| 2006/0070298 A1 * | 4/2006 | Palsrok | A01G 9/022 | 47/66.3 |
| 2006/0112630 A1 * | 6/2006 | Kimes | A01G 31/02 | 47/62 C |
| 2009/0107043 A1 | 4/2009 | Carney | | |
| 2009/0119987 A1 * | 5/2009 | Ingrassia | A01G 9/028 | 47/66.5 |
| 2009/0260284 A1 * | 10/2009 | Barbalho | A01G 9/033 | 47/65.9 |
| 2011/0232185 A1 * | 9/2011 | Ahmadi | A01G 27/04 | 47/66.6 |
| 2012/0005958 A1 * | 1/2012 | Laitsch | A01G 31/02 | 47/62 R |
| 2012/0073195 A1 * | 3/2012 | Crosby | A01G 9/02 | 47/66.7 |
| 2014/0259908 A1 * | 9/2014 | Halmos | A01G 31/02 | 47/60 |
| 2015/0007497 A1 * | 1/2015 | Delp, II | A01G 9/04 | 47/66.7 |
| 2015/0296725 A1 * | 10/2015 | Mong | A01G 31/02 | 47/62 A |
| 2016/0037735 A1 | 2/2016 | Blackmore, Jr. | | |
| 2016/0037739 A1 * | 2/2016 | Fankuchen | A01G 31/02 | 47/62 R |
| 2016/0044874 A1 * | 2/2016 | Tsonakis | A01G 9/028 | 47/66.5 |
| 2016/0183487 A1 * | 6/2016 | Kabakov | G06K 7/10009 | 47/59 R |
| 2016/0227720 A1 * | 8/2016 | Villalon | A01G 31/02 | |
| 2016/0235024 A1 * | 8/2016 | Xu | A01G 31/02 | |
| 2016/0262320 A1 * | 9/2016 | Ruys | A01G 27/02 | |
| 2016/0324077 A1 * | 11/2016 | Frantzen | A01G 31/02 | |
| 2017/0172082 A1 * | 6/2017 | Weiss | A01G 31/02 | |
| 2017/0202156 A1 * | 7/2017 | Harms | A01G 7/04 | |
| 2017/0245441 A1 * | 8/2017 | Kirkley | A01G 9/028 | |
| 2017/0245442 A1 * | 8/2017 | Stewart | A01G 9/16 | |
| 2017/0339853 A1 * | 11/2017 | Sun | A01G 7/00 | |
| 2018/0000027 A1 * | 1/2018 | Rodrigues | A01G 9/026 | |
| 2018/0077884 A1 * | 3/2018 | Barker | A01G 9/0295 | |
| 2018/0332785 A1 * | 11/2018 | Overgaag | A01G 27/00 | |

* cited by examiner

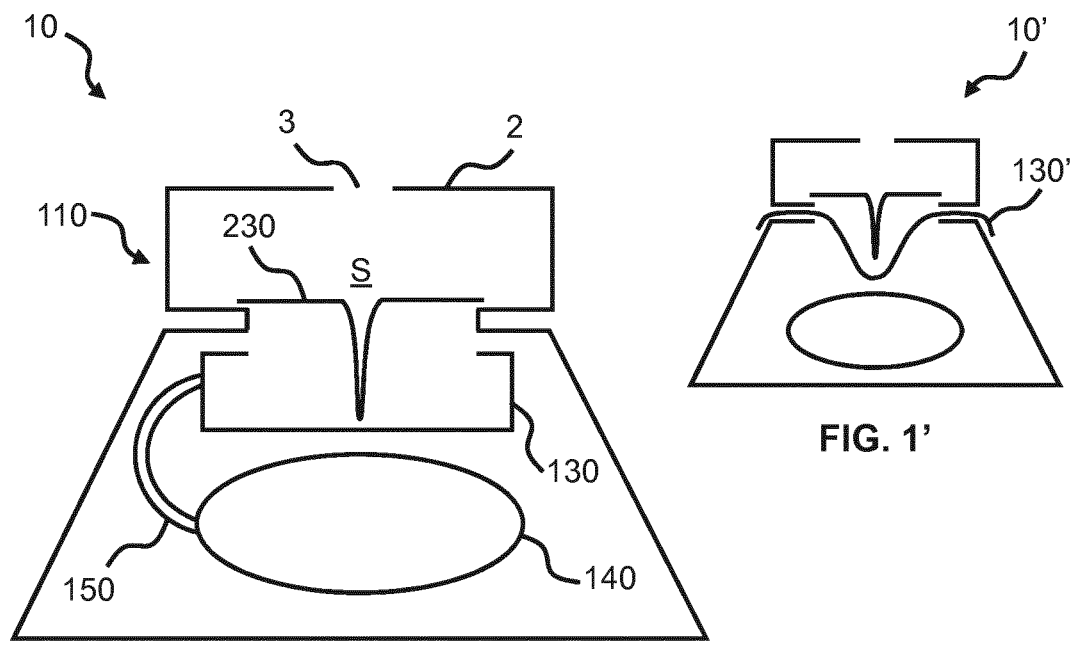
FIG. 1
FIG. 1'
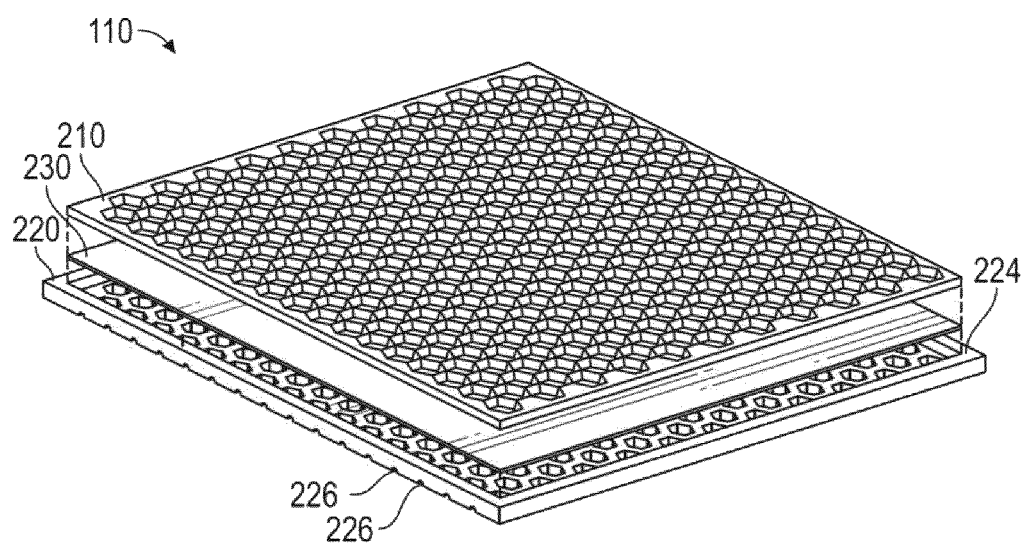
FIG. 2C

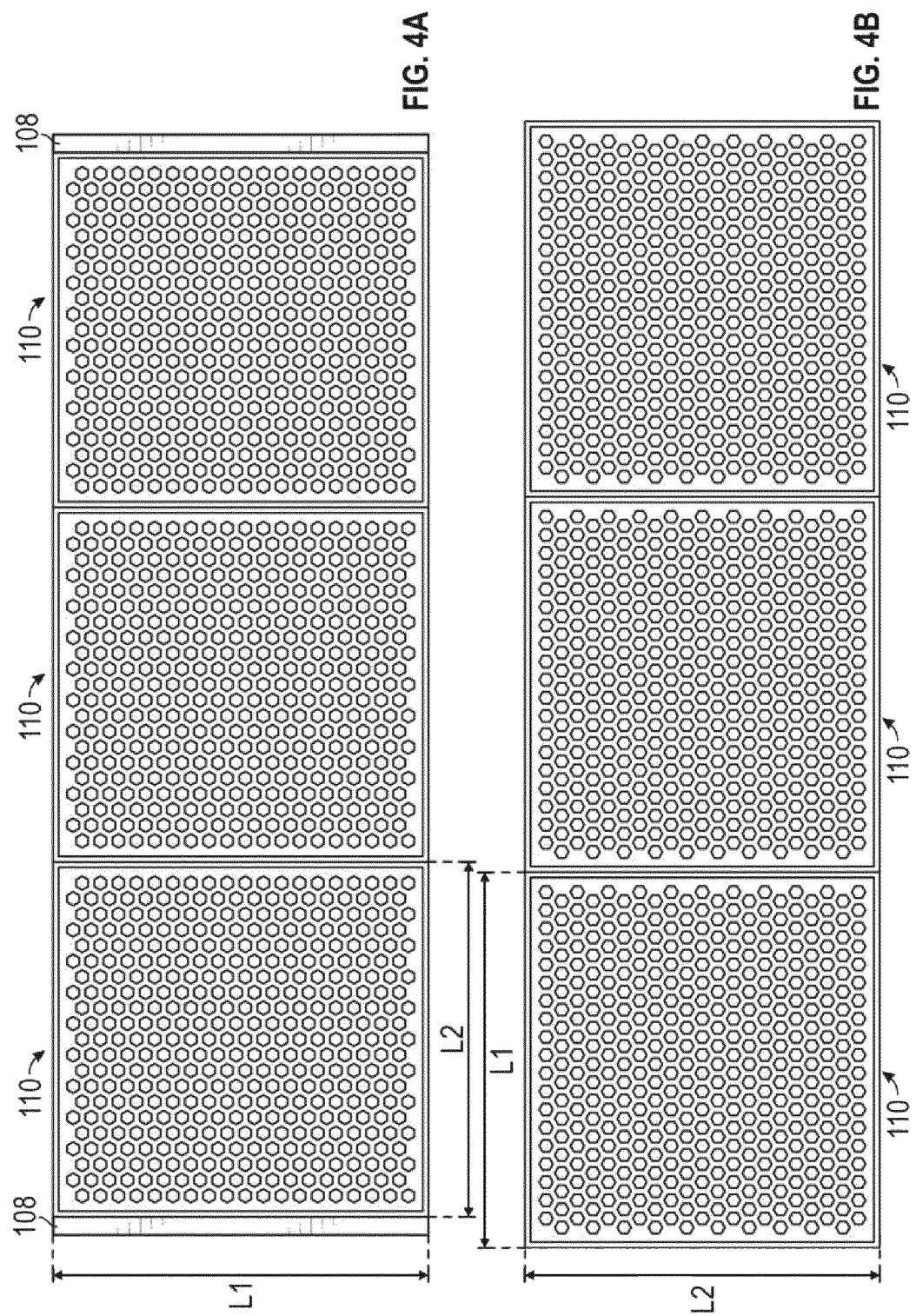

HYDROPONIC SYSTEM

PRIORITY

The application claims the priority of International Application No. PCT/EP2018/081977, filed on Nov. 20, 2018, titled "IMPROVED HYDROPONIC SYSTEM", which claims priority to Great Britain Application No. 1719306.1, filed on Nov. 21, 2017. The entire disclosures of each of the applications are incorporated herein by reference.

BACKGROUND

Hydroponics is a type of hydroculture in which plants are grown without soil, instead using mineral nutrient solutions in a water solvent. Using hydroponic systems, terrestrial plants can be grown with only their roots exposed to the mineral nutrient solution.

Historically, hydroponic systems involved many parts, such as pipes, various valves, pumps, manifolds, reservoirs, etc. While effective, such systems suffer from several drawbacks, such as but not limited to complex setup, high number of parts to maintain, increased incidence of a part failure, difficulty in cleaning, and difficulty with expansion. Therefore, there is a need for superior hydroponic systems.

SUMMARY

According to some embodiments, a hydroponic system is provided. The system includes a grow assembly. The grow assembly includes a body comprising at least one aperture, and a porous layer.

The body may be in the form of a tray assembly including a removable upper tray, and a lower tray. When the body is in the form of a tray assembly, the grow assembly may be referred to as a grow tray assembly. The removeable upper tray may include a first plurality of apertures and the lower tray may include a second plurality of apertures. That is, the at least one aperture of the grow assembly may comprise a first plurality of apertures of the removable upper tray and a second plurality of apertures of the lower tray. When the body is in the form of a tray assembly, the porous layer is disposed between the removable upper tray and the lower tray. The system may include a support to support the grow assembly. The support may be in the form of a plurality of support legs. The support may be integral with a portion of the body.

The system includes a fluid table. The fluid table may be located underneath the porous layer. The fluid table may be located underneath the lower tray, when the body is in the form of a tray assembly. The system includes a fluid reservoir. The fluid reservoir may be located or disposed underneath the fluid table. The fluid reservoir may be flexible, and collapsible when not filled with nutrient fluid. The system includes a fluid riser in fluid communication with the fluid reservoir and the fluid table. The system may include a fluid pump in fluid communication with the fluid reservoir, wherein the fluid riser is in fluid communication with the fluid pump and the fluid table.

According to some embodiments, a method for utilising a hydroponic system is provided. The method includes providing a grow assembly comprising a porous layer and a body comprising at least one aperture. The body and porous layer may form a grow tray assembly, wherein the body is in the form of a tray assembly comprising: a removable upper tray comprising a first plurality of apertures, and a lower tray comprising a second plurality of apertures. The providing a grow tray assembly may comprise disposing a porous layer on the lower tray and disposing the removable upper tray on the porous layer and over the lower tray. The method includes providing at least one seed on the porous layer. The providing at least one seed may comprise dispersing a plurality of seeds on the porous layer and within the first plurality of apertures of the removable upper tray, where the grow assembly is a grow tray assembly. The method includes providing a fluid table, a fluid reservoir and a fluid riser in fluid communication with the fluid reservoir and the fluid table. The providing a fluid table may include disposing the fluid table underneath the porous layer. The providing a fluid reservoir may include disposing the fluid reservoir underneath the fluid table. The providing a grow assembly may include disposing the grow assembly on the fluid table of the hydroponic system. The disposing the grow assembly may comprise positioning the grow assembly in a first orientation such that the lower tray is disposed on a fluid table of the hydroponic system, where the grow assembly is a grow tray assembly. The method includes flowing a nutrient fluid over the fluid table from the fluid reservoir disposed underneath the fluid table through the fluid riser in fluid communication with the fluid reservoir and the fluid table. The flowing a nutrient may comprise flowing a nutrient fluid over the fluid table utilising a fluid pump configured to pump the nutrient fluid from a fluid reservoir disposed underneath the fluid table through a fluid riser in fluid communication with the fluid pump and the fluid table. The method may include supporting the grow assembly with a support. The supporting the grow assembly may comprise, based on at least a subset of the plurality of seeds sprouting roots through the porous layer and corresponding apertures of the second plurality of apertures of the lower tray, positioning the grow assembly in a second orientation, perpendicular to the first orientation, such that the lower tray is supported by the support of the hydroponic system and disposed a predetermined distance above the fluid table, where the grow assembly is a grow tray assembly. The supporting the grow assembly may comprise supporting with a plurality of support legs which form the support.

BRIEF DESCRIPTION OF THE DRAWINGS

FIG. 1 illustrates a schematic diagram of a hydroponic system, according an example embodiment.

FIG. 1' illustrates another example of a hydroponic system.

FIG. 2C illustrates an exploded perspective view of a grow tray assembly comprising the removable upper tray of FIG. 2A and the lower tray of FIG. 2B, according to example embodiments.

FIG. 4A illustrates a plan view of the plurality of grow tray assemblies, as shown in FIG. 2C, disposed in the first orientation.

FIG. 4B illustrates a plan view of the plurality of grow tray assemblies, as shown in FIG. 2C, disposed in the second orientation.

DETAILED DESCRIPTION

Figure 1A:
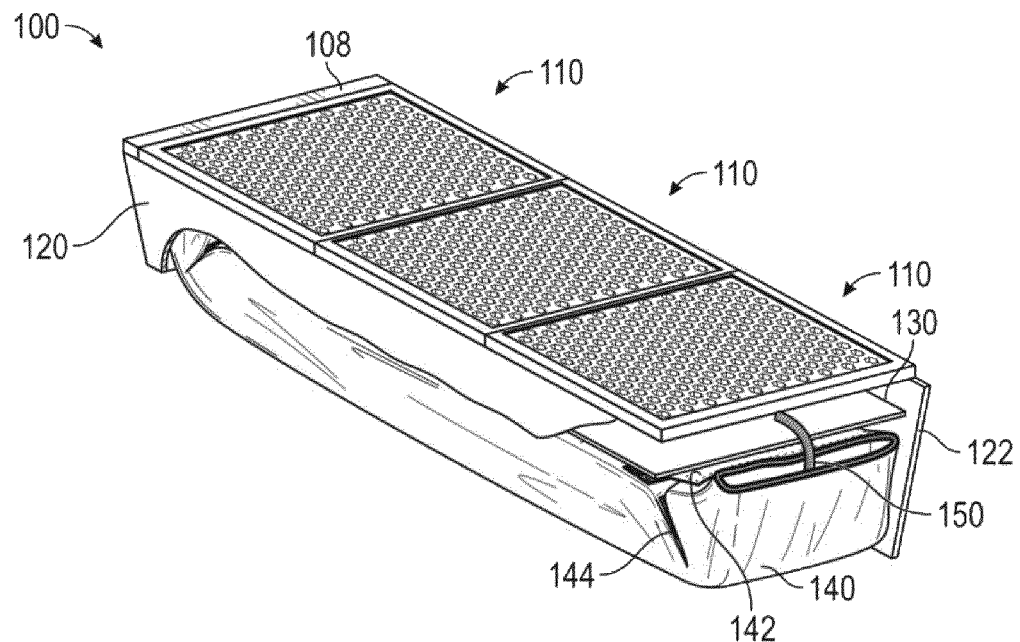
FIGS. 1A to 1H respectively illustrate a perspective view of a hydroponic system, according to some example embodiments (with FIG. 1F showing an array of hydroponic systems).

Currently available hydroponic systems involve many parts, such as pipes, various valves, pumps, manifolds, reservoirs, etc. While effective, such systems suffer from several drawbacks, such as but not limited to complex setup, high number of parts to maintain, increased incidence of a part failure as well as difficulty with cleaning and expansion. Accordingly, the present disclosure describes embodiments of new hydroponic systems that are more compact, have fewer parts, are easier to clean, utilise less energy, are easier to setup and breakdown, and that store with substantially no unused space compared to currently available hydroponic systems. FIGS. 1, 1A-1H, as described below, illustrate various embodiments of some example hydroponic systems 10, 100, 102, 104, 106, 200, 300, 400.

FIG. 1 illustrates a schematic diagram of a hydroponic system 10, according to some example embodiments. The hydroponic system 10 comprises a grow assembly 110. The grow assembly 110 comprises: a body 2 comprising an aperture 3, and a porous layer 230. The system 10 further comprises a fluid table 130, a fluid reservoir 140 and a fluid riser 150 in fluid communication with the fluid reservoir and the fluid table.

In some embodiments, the body 2 of the hydroponic system 10 may comprise a support to support the grow assembly 110. The support may be a plurality of support legs.

In the example embodiment of FIG. 1, the fluid table 130 is separate to the body 2 and disposed underneath the body 2. Furthermore, the fluid reservoir 140 is disposed underneath the fluid table 130. In other embodiments, the fluid table 130 and/or the fluid reservoir 140 may be integral and formed as part of one component, such as the housing 4 in the embodiment of FIG. 1E.

In the example embodiment of FIG. 1, the body 2 is self-supporting. The location for a seed S or a plurality of seeds S is shown. For example, a single seed S may be associated with a single aperture. In other embodiments, at least one aperture is provided, for example a plurality of apertures, and one seed may be located in the region of each aperture.

In some example embodiments, the fluid table 130 is made from a flexible material, such as plastic. The fluid table 130 may therefore be provided as a sheet, for example a sheet of plastic. Additionally, a liner (not shown) may cover the fluid table 130. The liner can be removable so that it can be replaced with a fresh liner. One liner can be provided for each growing cycle, for example. In some example embodiments, when the fluid table 130 is provided as a flexible material, the fluid table 130 may extend towards the fluid reservoir 140. That is, the fluid table 130 may be downwardly-protruding. An example of such an embodiment is shown in FIG. 1'. Here, a further hydroponic system 10' comprising a fluid table 130' made from a flexible material is shown. The hydroponic system 10' is otherwise the same as the hydroponic system 10 shown in FIG. 1.

Figure 5A:
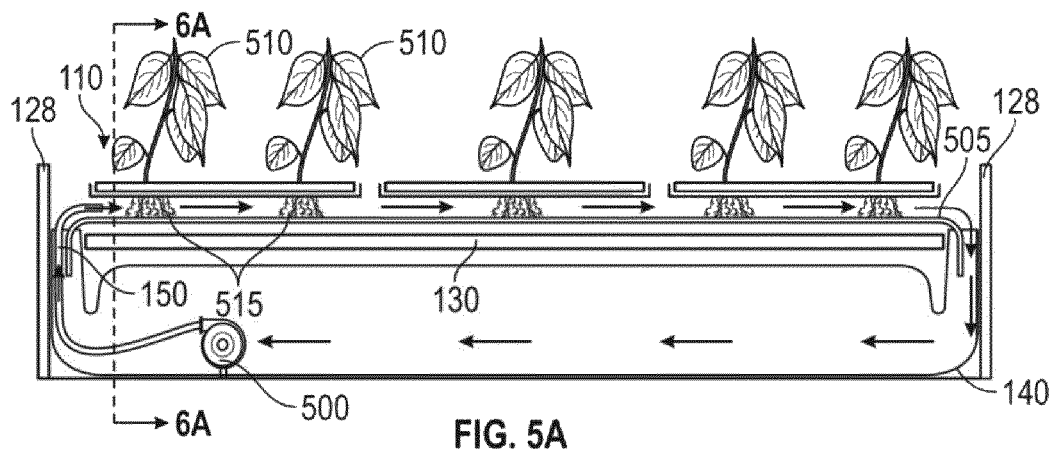
FIG. 5A illustrates a cross-sectional view of a fluid flow within a hydroponic system, according to example embodiments.
Figure 5B:
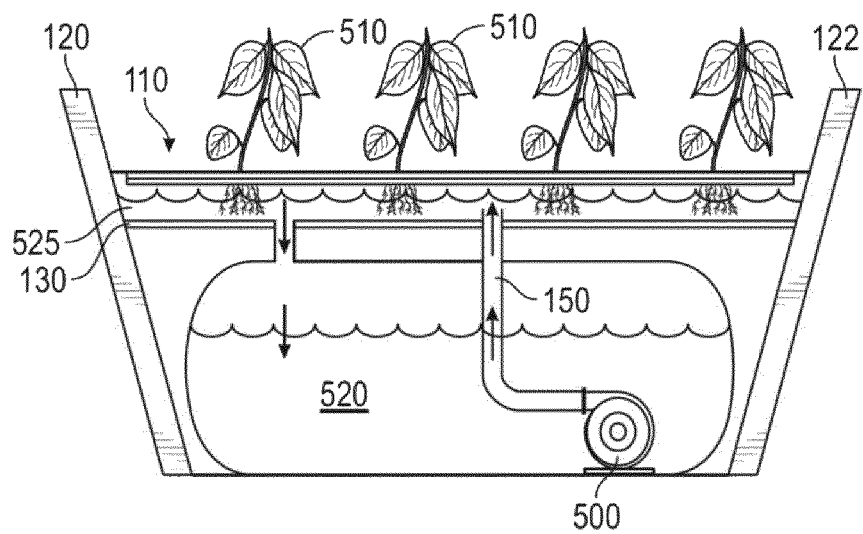
FIG. 5B illustrates transverse cross-sectional view of the hydroponic system of FIG. 5A taken in the plane "6A".

FIG. 1A illustrates a perspective view of a hydroponic system 100, according to some example embodiments. The hydroponic system 100 comprises at least one grow assembly, herein referred to as a grow tray assembly 110 because the body is in the form of a tray assembly and includes a plurality of trays. That is, the combination of the body and the porous layer form the grow tray assembly when the body is in the form of the tray assembly. The system further comprises a plurality of support legs 120, 122 defining a support, a fluid table 130, a fluid reservoir 140, a fluid pump 500 (as seen in FIGS. 5A and 5B), and a fluid riser 150.

Figure 1B:
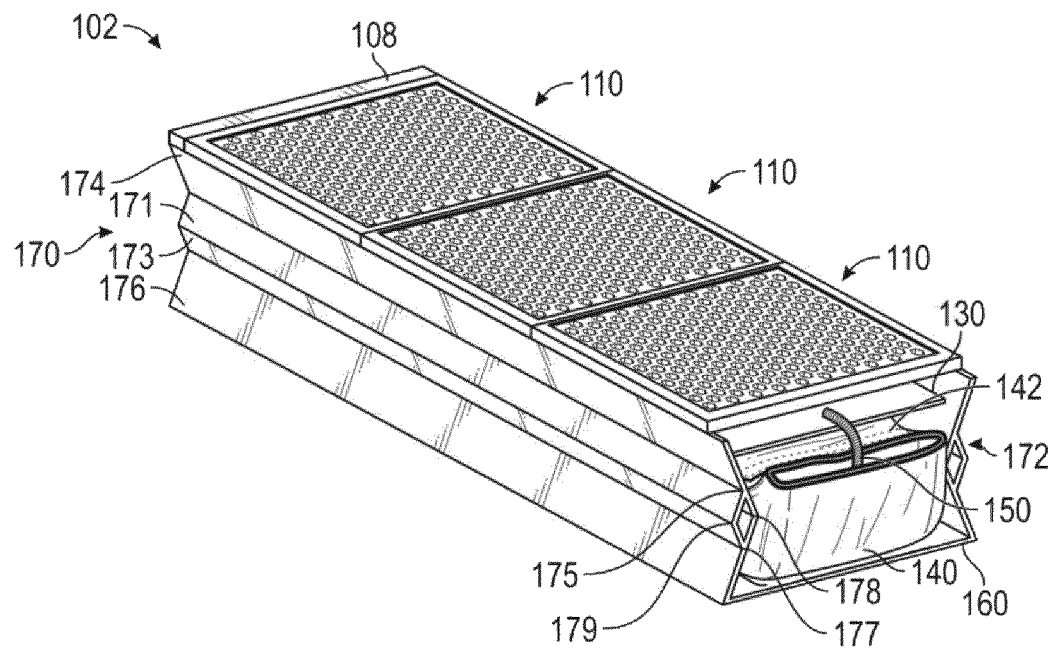

Each of the plurality of support legs 120, 122 can be disposed at an angle with respect to the horizontal and the vertical, for example forming an angle with the horizontal that is greater than 0° and less than 90°, more specifically an angle greater than 45° and less than 90° in some embodiments. Accordingly, a separation between upper edges of support legs 120 and 122 can be greater than a separation between lower edges of support legs 120 and 122. Although not shown in FIG. 1A, lower edges of the plurality of support legs 120, 122 can be coupled to a base 160 (as seen in FIG. 1B) via a hinge, for example a living hinge, although any other type of hinge is also contemplated. In some alternative embodiments, lower edges of the plurality of support legs 120, 122 may not be coupled to base 160 but can be in contact with base 160 such that the lower edges are immobilised in the orientation shown in FIG. 1A.

The plurality of support legs 120, 122 can be in contact with the at least one grow tray assembly 110, specifically a lower tray of each grow tray assembly 110, as will be described in more detail in connection with FIGS. 2B and 2C. In this way the plurality of support legs 120, 122 can be configured to support the at least one grow tray assembly 110 in each of two substantially perpendicular orientations having correspondingly different elevations above fluid table 130, as will be described in more detail in connection with FIGS. 3A-4B. In some embodiments, the plurality of support legs 120, 122 can be configured to fold substantially flat beneath the at least one grow tray assembly 110 when not in use, for example, during shipping and/or storage.

In some embodiments, hydroponic system 100 can comprise a guide 108 disposed between support leg 120 and support leg 122 and configured to define an edge against which to place the at least one grow tray assembly 110 in at least one of the two substantially perpendicular orientations.

Figure 2A:
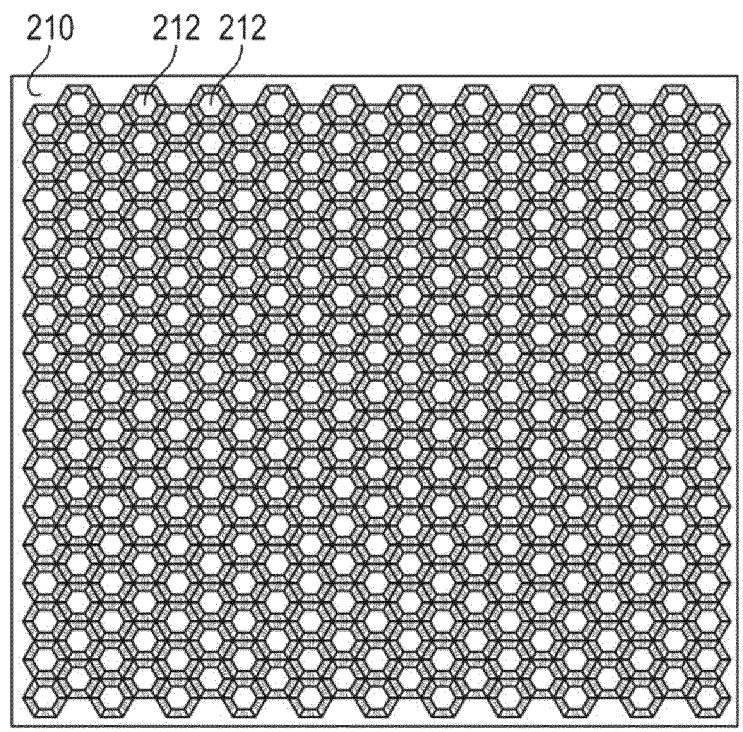
FIG. 2A illustrates a plan view of a removable upper tray of a grow tray assembly for a hydroponic system, according to some example embodiments.
Figure 2B:
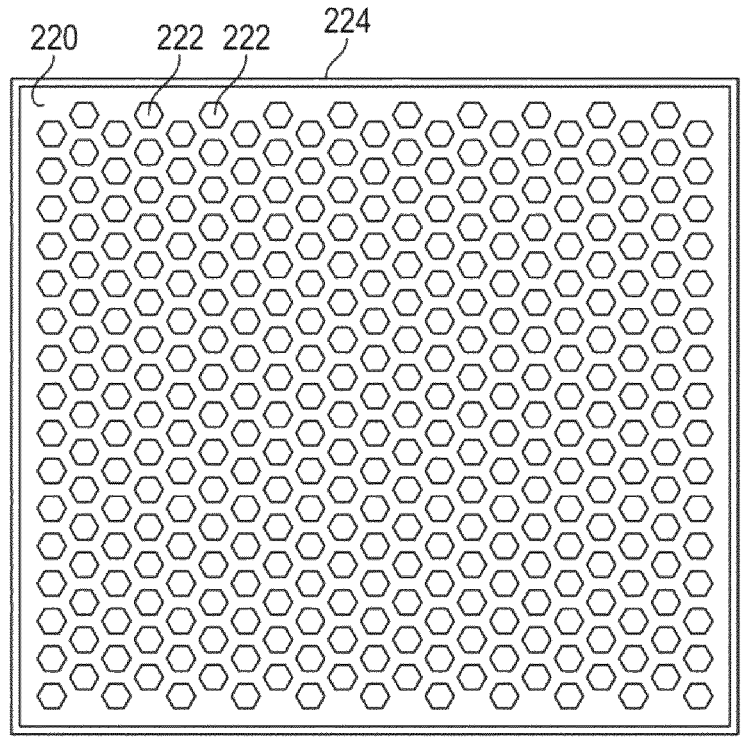
FIG. 2B illustrates a plan view of a lower tray of a grow tray assembly for a hydroponic system, according to example embodiments.

Fluid table 130 is disposed underneath grow tray assembly 110, specifically underneath a lower tray (as seen in FIGS. 2B and 2C) of each grow tray assembly 110. Fluid table 130 can be held in place in any number of ways, e.g., friction between edges of fluid table 130 and inside surfaces of the plurality of support legs 120, 122, edges of fluid table 130 fitting into respective grooves (as seen in for example FIG. 3A) disposed in the inside surfaces of the plurality of support legs 120, 122, or edges of fluid table 130 being supported by respective ridges extending away from the inside surfaces of the plurality of support legs 120, 122 (as seen in for example FIG. 3A). A separation between the at least one grow tray assembly 110 and the underlying fluid table 130 in at least one of the two orientations can depend on the type of plant being grown and can be sufficient to position at least part of the root systems of the plants in a nutrient fluid flowing on a surface of fluid table 130. As will be described in more detail in connection with FIG. 5A, fluid table 130 can be disposed at a slight angle with respect to the horizontal such that gravity induces a fluid introduced over a top surface of fluid table 130 to flow along a length of fluid table 130 underneath the at least one grow tray assembly 110. Accordingly, a first side of fluid table 130 can be inclined relative to a second side of fluid table 130 opposite the first side. Such a slight angle can be within a range such that a ratio between a rise of fluid table 130 and a length along which nutrient fluid flows along fluid table 130 is between 1:1000 and 50:1000, inclusive, although any other angle for fluid table 130 is contemplated.

Figure 1C:
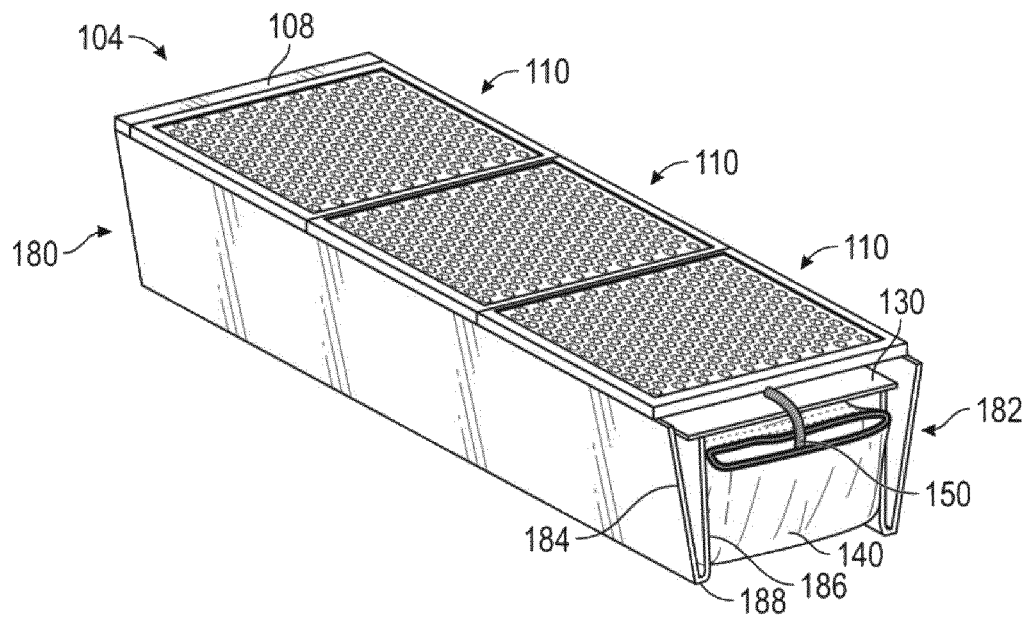
Figure 1D:
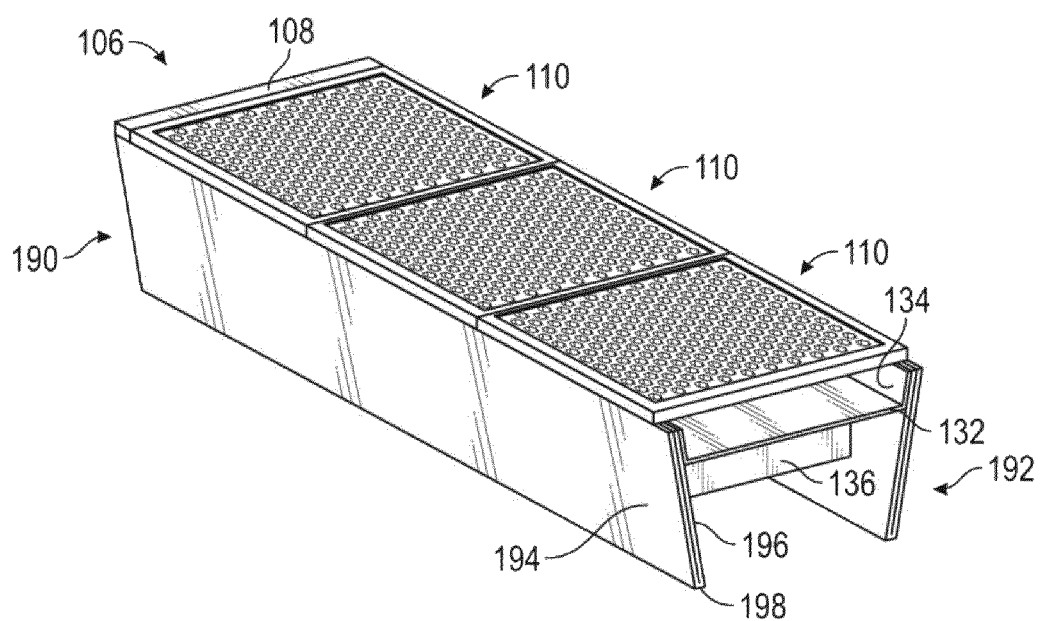

One or more of the plurality of support legs 120, 122, base 160, fluid table 130 and guide 108 can comprise a lightweight, strong, and/or inexpensive material such as plastic, aluminum, etc. In embodiment, plastics such as polypropylene can be used. Moreover, in some such embodiments, one or more hinges coupling any of the plurality of support legs 120, 122, base 160, guide 108, and/or fluid table 130 can comprise living hinges such that one or more of the plurality of support legs 120, 122, base 160, guide 108, and/or fluid table 130 can be formed of a single piece, further reducing part count and further simplifying setup and maintenance of hydroponic system 100 or any other system described herein, e.g., 102, 104, 106 (as seen in FIGS. 1B-1D).

Fluid reservoir 140 is disposed underneath the fluid table 130 and between the plurality of support legs 120, 122. The fluid reservoir 140 comprises a flexible, non-rigid bladder formed of a material such as rubber, plastic, or any other material having sufficient flexibility and pliability to at least partially take the shape of its surroundings, e.g., at least a portion of support legs 120, 122, when at least partially filled with fluid and at least partially collapse under its own weight when unfilled. In some embodiments, fluid reservoir 140 can comprise a flexible plastic or rubber cylinder, e.g., a rolled cylinder of plastic or rubber. In some embodiments, fluid reservoir 140 can be black in colour and/or opaque to visible light and/or other wavelengths of electromagnetic radiation that stimulate algae and/or other plant growth.

Figure 6A:
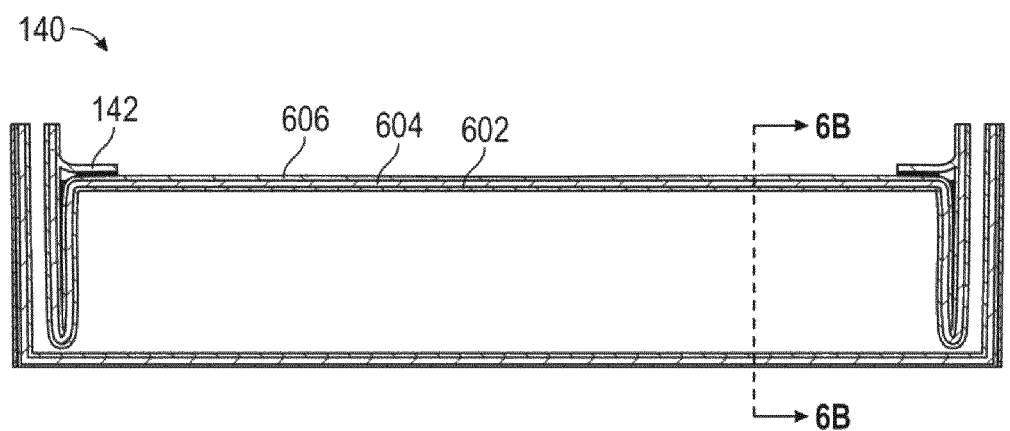
FIG. 6A illustrates a cross-sectional view of a fluid reservoir, according to example embodiments.

In some embodiments, fluid reservoir 140 can be open at each end. In such embodiments, each end of fluid reservoir 140 can be turned up at an angle sufficient to prevent fluid within fluid reservoir 140 from spilling out either end. For example, each end of fluid reservoir 140 can be turned up such that an opening at each end of fluid reservoir 140 forms a plane having a normal vector approximately 90° from the horizontal, although any other angle sufficient to prevent fluid within fluid reservoir 140 from spilling out either end is also contemplated. In some embodiments, each end of fluid reservoir 140 can be fixed in this up-turned orientation utilising one or more fasteners 142, for example hook-and-loop fasteners such as Velcro®, although any other type of fastener is also contemplated. Such an up-turned orientation can cause a crease 144 to form near each end of fluid reservoir 140, which can further reduce evaporation of fluid from within fluid reservoir 140 by physically cutting off a surface of the fluid within fluid reservoir 140 from exposure to the outside environment. In some embodiments, hydroponic system 110 can, in addition or alternative to such fasteners, comprise inserts 128 (as seen in FIGS. 3C and 6A) configured to contact, and thereby hold, each end of fluid reservoir 140 in the illustrated up-turned orientation. In some embodiments, inserts 128 can be held in place utilising one or more fasteners. In some embodiments, inserts 128 can be disposed at an angle with respect to the horizontal and the vertical, for example forming an angle with the horizontal that is greater than 0° and less than 90°, more specifically an angle greater than 45° and less than 90° in some embodiments.

In some other embodiments, instead of having open, upturned ends, fluid reservoir 140 may be substantially sealed at each end and, instead, may comprise a first orifice disposed a predetermined distance from a first end and on an upper surface of fluid reservoir 140 when at least partially filled, and a second orifice disposed a predetermined distance from a second end of the fluid reservoir 140 on the supper surface of fluid reservoir 140. In some embodiments the second end can be opposite the first end. The first orifice and the second orifice may have any suitable shape, e.g., circular, ovoid, polygonal or irregular shaped. The first orifice may be configured to allow fluid riser 150 to extend out from within fluid reservoir 140 for pumping nutrient fluid onto a surface of fluid table 130. The second orifice may be configured to allow the nutrient fluid to flow back into fluid reservoir 140 from an opposite side of fluid table 130.

In yet other embodiments, fluid reservoir 140 may have a first end that is substantially sealed and a second end, opposite the first end, that is open and upturned as previously described. In some of such embodiments, the second, open and upturned end may be disposed substantially underneath a lowest, drain side of fluid table. The second, open and upturned end may provide for both nutrient fluid delivery to fluid table 130 and drainage from fluid table 130. For example, fluid riser 150 may extend out of the second, open and upturned end of fluid reservoir 140 and may extend along fluid table 130, either over or under fluid table 130, such that nutrient fluid is released onto fluid table 130 at an end opposite the second, open and upturned end of fluid reservoir 140, which may also be opposite a lower, drainage end of fluid table 130. Accordingly, nutrient fluid may be pumped from the second, open and upturned end of fluid reservoir 140 to an opposite, highest end of fluid table 130 via fluid riser 150, the nutrient fluid 130 may flow across fluid table 130 and empty back into second, open and upturned end of fluid reservoir 140.

Fluid reservoir 140 can be positioned underneath fluid table 130 such that a level of fluid within fluid reservoir 140, when properly filled, is a predetermined vertical distance below a top surface of fluid table 130, e.g., 10-20 centimetres (cm). However, such a range is an example only and any other vertical distance or range of vertical distances suitable for a particular growing application is also contemplated. Fluid reservoir 140 is described in more detail in connection with FIGS. 6A-6C below.

Hydroponic system 100 can further comprise a fluid pump 500 (as seen in FIGS. 5A and 5B) in fluid communication with fluid reservoir 140. In some embodiments, fluid pump 500 can be submersible, disposed within fluid reservoir 140, and in fluid communication with a fluid disposed within fluid reservoir 140. Fluid pump 500 can be configured to pump a nutrient fluid, e.g., mineralised water, from fluid reservoir 140, through a fluid riser 150, onto fluid table 130. Fluid riser 150 can comprise a rigid or flexible tube in fluid communication with fluid pump 500 at a first end and fluid table 130 at a second end.

In operation, the fluid pump 500 pumps nutrient fluid through one side of fluid reservoir 140, via fluid riser 150, onto the first side of fluid table 130. Once on fluid table 130, gravity causes the fluid to spread out across fluid table 130, forming a flowing nutrient fluid layer 525 (as seen in FIG. 5B) underneath the at least one grow tray assembly 110. The fluid then flows over the second side of the fluid table 130, and down into the opposite side of fluid reservoir 140, recycling the nutrient fluid.

Such a compact, simple design dispenses with extraneous plumbing and piping, making hydroponic system 100 simpler, less expensive, and significantly easier to clean than alternative systems available. Moreover, the compact positional arrangement of at least fluid reservoir 140, the fluid pump 500, and fluid table 130 allows a much smaller fluid pump to be used since fluid need only be pumped a vertical distance from the reservoir fluid surface of, e.g., 10-20 cm, compared with vertical distances which can exceed 1 metre (m) in alternative systems available. This lower vertical pumping requirement not only allows hydroponic system 100 to use a less expensive, less powerful, and easier to maintain pump, but also avoids a potential problem experienced with alternative systems requiring such larger pumps; that such larger pumps give off significantly more waste heat and thereby increase the temperature and, via thermal expansion, the physical level of the fluid beyond growing tolerances.

Although not shown in FIG. 1A, hydroponic system 100 can further comprise a fluid heater configured to maintain the nutrient fluid within fluid reservoir 140 at a desired temperature. FIG. 1B illustrates a perspective view of another hydroponic system 102, according to some example embodiments. Hydroponic system 102 is substantially identical to hydroponic system 100 previously described in connection with FIG. 1A, except as described below.

Hydroponic system 102 comprises a plurality of support legs 170, 172. Each support leg 170, 172 comprises a first portion 174, a second portion 176, and a hinge 178 coupling first portion 174 to second portion 176. In some embodiments, hinge 178 is a living hinge, although any other type of hinge is also contemplated.

In some embodiments, each support leg 170, 172 further comprises a third portion 171 coupled to first portion 174 via a hinge 175, a fourth portion 173 coupled to second portion 176 via a hinge 177, and a hinge 179 coupling third portion 171 to fourth portion 173. In some embodiments, hinges 175, 177, 179 can be living hinges, although any other type of hinges are also contemplated. As shown, first portion, 174, second portion 176, third portion 171, and fourth portion 173, along with the above-described hinges form a diamond-shaped hinge assembly.

First portion 174 and second portion 176 of each of support legs 170, 172 can be disposed at an angle with respect to the horizontal and the vertical, for example forming an angle with the horizontal that is greater than 0° and less than 90°, more specifically an angle greater than 45° and less than 90° in some embodiments. Accordingly, a separation between upper edges of first portions 174 of each of support legs 170, 172 can be greater than a separation between hinges 178 of each of support legs 170, 172. Similarly, a separation between lower edges of second portions 176 of each of support legs 170, 172 can be greater than a separation between hinges 178 of each of support legs 170, 172. As shown in FIG. 1B, in some embodiments, lower edges of second portions 176 of at least one of support legs 170, 172 can be coupled to base 160 via a hinge, for example a living hinge, although any other type of hinge is also contemplated. In some alternative embodiments, lower edges of second portions 176 of support legs 170, 172 may not be coupled to base 160 but can be in contact with base 160 such that the lower edges are immobilized in the orientation shown in FIG. 1B.

In some embodiments, for each of support legs 170, 172, a threaded shaft (not shown in FIG. 1B) can articulate with a complementarily threaded feature (not shown in FIG. 1B) disposed in one of third portion 171, fourth portion 173, or hinge 179 and a complementary threaded feature (not shown in FIG. 1B) disposed in one of first portion 174, second portion 176, or hinge 178 such that when the threaded shaft is rotated, hinges 178 and 179 are drawn closer to or farther away from one another, thereby adjusting the height of support legs 170, 172.

First portions 174 of support legs 170, 172 can be in contact with the at least one grow tray assembly 110, specifically a lower tray of each grow tray assembly 110, as will be described in more detail in connection with FIGS. 2B and 2C. In this way support legs 170, 172 can be configured to support the at least one grow tray assembly 110 in at least one of two substantially perpendicular orientations having correspondingly different elevations above fluid table 130, as will be described in more detail in connection with FIGS. 3A-4B.

When at least partially filled with fluid, fluid reservoir 140 can be configured to press against an inside surface of each of support legs 170, 172 thereby preventing support legs 170, 172 from folding inward. Additionally, fluid table 130 can be held in place as described above in connection with FIG. 1A, however, being in contact with first portions 174 of support legs 170, 172, rather than support legs 120, 122.

When being stored or during shipping, support legs 170, 172 can be configured to fold substantially flat beneath the at least one grow tray assembly 110. For example, hinge 178 of each of support legs 170, 172 travels inward and down toward base 160 until first portion 174 is flat against second portion 176 for each of support legs 170, 172.

For embodiments further comprising third portion 171 and fourth portion 173, hinge 178 of each of support legs 170, 172 travels inward and down toward base 160, while hinge 179 of each of support legs 170, 172 travel outward and down toward base 160 until first portion 174 is nearly flat against third portion 171, third portion 171 is nearly fat against fourth portion 173, and fourth portion 173 is nearly flat against second portion 176 for each of support legs 170, 172.

FIG. 1C illustrates a perspective view of yet another hydroponic system 104, according to some example embodiments. Hydroponic system 104 can be substantially identical to hydroponic system 100 previously described in connection with FIG. 1A, except as described below.

Hydroponic system 104 comprises a plurality of support legs 180, 182. Each support leg 180, 182 comprises a first portion 184, a second portion 186, and a hinge 188 coupling first portion 184 to second portion 186. In some embodiments, hinge 188 can be a living hinge, although any other type of hinge is contemplated.

For each support leg 180, 182, first portion 184 can be in contact with and support at least one grow tray assembly 110 when the at least one grow tray assembly 110 is positioned in at least one of two orientations, as will be described in more detail in connection with FIGS. 3A-4B. A lower edge of first portion 184 can be in contact with the ground or a flat surface on which hydroponic system 104 is disposed. An upper edge of second portion 186 can be in contact with and support fluid table 130 and a lower edge of second portion 186 can be in contact with the ground or flat surface on which hydroponic system 104 is disposed.

In some embodiments, first portion 184 of each of support legs 180, 182 can be disposed at an angle with respect to the horizontal and the vertical, for example forming an angle with the horizontal that is greater than 0° and less than 90°, more specifically an angle greater than 45° and less than 90° in some embodiments. Accordingly, a separation between upper edges of first portions 184 of each of support legs 180, 182 can be greater than a separation between lower edges of first portions 184 of each of support legs 180, 182. In some embodiments, second portion 186 of each of support legs 180, 182 can be disposed substantially vertically, or at a slight angle in either direction from the vertical. Second portion 186 of each of support legs 180, 182 can be configured to support fluid table 130.

When at least partially filled with fluid, fluid reservoir 140 can be configured to press against an inside surface of second portion 186 of each of support legs 180, 182 thereby preventing at least second portions 186 of each of support legs 180, 182 from folding inward. When not in use or during shipping, support legs 180, 182 can be configured to fold substantially flat beneath the at least one grow tray assembly 110.

FIG. 1D illustrates a perspective view of yet another hydroponic system 106, according to some example embodiments. Hydroponic system 106 can be substantially identical to hydroponic system 100 previously described in connection with FIG. 1A, except as described below.

Hydroponic system 106 comprises a plurality of support legs 190, 192. In some embodiments, each support leg 190, 192 can be substantially the same as respective support legs 120, 122 of FIG. 1A. In some other embodiments, as shown in FIG. 1D, each support leg 190, 192 comprises a first portion 194 and a second portion 196. In some embodiments, first portion 194 and second portion 196 are bonded together without any hinge. In some other embodiments, a hinge 198 couples first portion 194 to second portion 196. In some embodiments, hinge 198 can be a living hinge, although any other type of hinge is contemplated. In either case, support legs 190, 192 can be disposed at angles with the horizontal and/or vertical as previously described for support legs 120, 122 in connection with FIG. 1A. Each support leg 190, 192 can be in contact with and support at least one grow tray assembly 110 when the at least one grow tray assembly 110 is positioned in at least one of two orientations, as will be described in connection with FIGS. 3A-4B.

In some embodiments, hydroponic system 106 can comprise fluid table 130 as previously described in connection with FIGS. 1A-1C. In some other embodiments, as shown in FIG. 1D, hydroponic system 106 comprises a fluid table 132 comprising sidewalls 134 configured to be respectively bonded to, or friction fit against, an inside surface of support legs 190, 192. In some embodiments, fluid table 132 is a separate structure from support legs 190, 192. In some other embodiments, fluid table 132 and support legs 190, 192 can be formed of a single piece of material, comprising living hinges at each fold.

Hydroponic system 106 further comprises at least one support element 136 disposed substantially perpendicular to, and in contact at its respective ends with, respective ones of support legs 190, 192. In some embodiments, the at least one support element 136 can be disposed at another angle than perpendicular to support legs 190, 192. Support element 136 is configured to support fluid table 132 and can also prevent support legs 190, 192 from collapsing inward during operation. Fluid reservoir 140 and fluid riser 150 are not shown in FIG. 1D for easy viewing of support element 136.

Figure 1E:
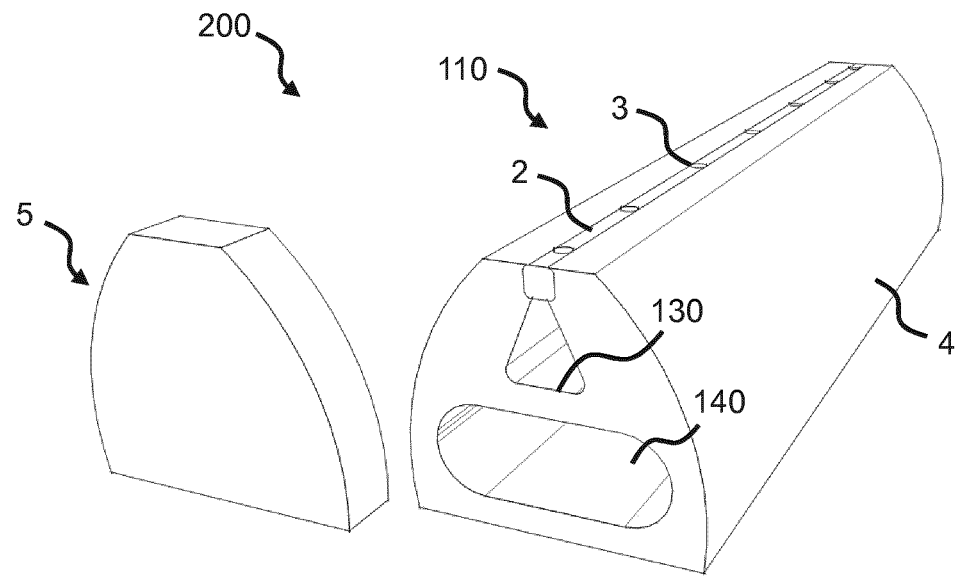

FIG. 1E illustrates a perspective view of yet another hydroponic system 200, according to some example embodiments. The hydroponic system 200 comprises at least one grow assembly 110, a housing 4 defining a support to support the grow assembly 110, a fluid table 130 and a fluid reservoir 140. A fluid pump 500 (as seen in FIGS. 5A and 5B), and a fluid riser 150 are not shown but can be part of the hydroponic system 200. The grow assembly 110 comprises a body 2 comprising a plurality of apertures 3 and a porous layer (not shown). The hydroponic system 200 shown in FIG. 1E is suitable for growing a vegetable. Furthermore, in some embodiments, the support may be a plurality of support legs, which may be part of the housing 4 or coupled to the housing 4.

In this example embodiment, the porous layer is arranged to wick fluid from the fluid table 130 towards a seed (not shown) that is provided on the porous layer. The wicking action can take place even if a thin film of fluid (such as water or nutrient water), which may be moving, is present on the fluid table 130. The porous layer is to support the seed and allow for fluid, such as nutrient water, to surround the seed. The porous layer may comprise an accommodation portion, such as a fold, that accommodates a seed and allows the seed to rest in position in a predetermined location on the porous layer. Fluid is then wicked from fluid, in the fluid table, to the seed by the porous layer to allow roots of the seed to grow towards the fluid table 130. The porous layer may be arranged to pass through an opening of the body 2 to protrude downwards from the body 2 and toward the fluid table 130. This allows the roots of the seed to grow into a space provided by a downwardly protruding portion of the porous layer. The downwardly protruding portion is a portion of the porous layer which extends away from the body 2 but rests on the body 2. The body 2 may comprise a fixing to hold a position of the porous layer to ensure a predetermined amount of the porous layer extends away from the body 2. In this example embodiment, the porous layer is formed by a wicking material such as burlap. Burlap is a woven fabric and is sometimes referred to as hessian. The porous layer is arranged to remain in place throughout a growing cycle of the seed.

In this example embodiment, the fluid table 130 and the fluid reservoir 140 are formed within the housing 4. In other example embodiments, the fluid table 130 is made of a flexible material, such as a sheet of plastic. In other embodiments, the housing 4 forms a first cavity within which to arrange a flexible fluid reservoir (not shown) and a second cavity in which to arrange the fluid table 130. That is, the fluid reservoir may be a bladder deformed by the fluid it contains. In embodiments where the fluid table 130 and the fluid reservoir 140 are formed in the housing 4, as shown in FIG. 1E, a flexible liner may be added to one or both of the fluid table 130 and the fluid reservoir 140. The flexible liner is removable so that one liner can be used for each growing cycle.

In this example embodiment, the body 2 is provided with a plurality of linearly aligned apertures 3. In other embodiments, an array of apertures 3 may be provided. The array of apertures 3 may comprise a plurality of rows and columns. In alternative embodiments a single aperture 3 may be provided. The body 2 is elongate and is insertable into the housing 4. The housing 4 is therefore arranged to accommodate the body 2 in an accommodation portion. The body 2 is therefore an insert that is detachable from the housing 4.

An end cover 5 is shown as part of the hydroponic system 200 of the example embodiment of FIG. 1E. The end cover 5 is optional in embodiments where the housing 4 forms a first cavity within which to arrange a flexible fluid reservoir (not shown) and a second cavity in which to arrange the fluid table 130.

Figure 1F:
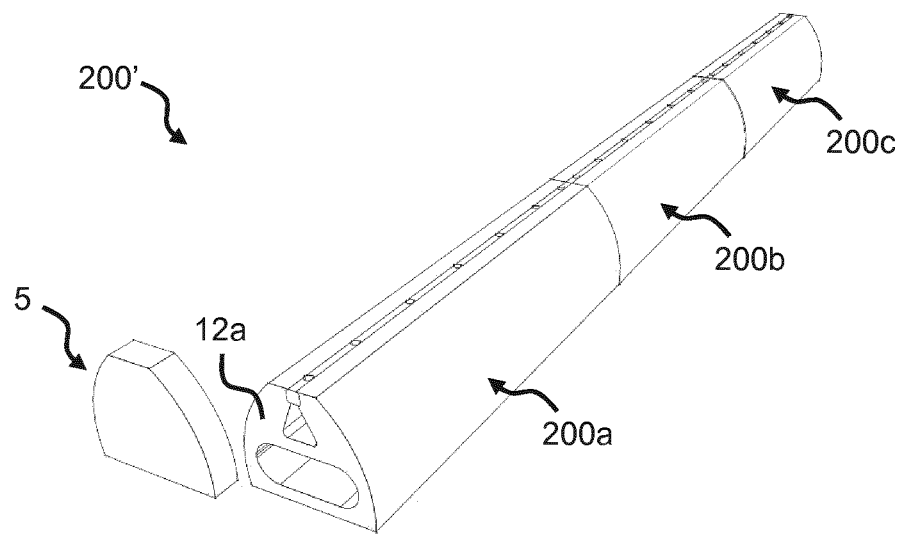

FIG. 1F illustrates a perspective view of an array 200' of hydroponic systems 200a-c, according to some example embodiments. The array 200' shown in FIG. 1F comprises multiple hydroponic systems 200 of FIG. 1E, wherein first to third hydroponic systems 200a-200c are provided. The first hydroponic system 200a comprises a first end for coupling to an end cover 5 and a second end for coupling to a second hydroponic system 200b. The second hydroponic system 200b further couples to a third hydroponic system 200b. In some embodiments, a coupling system may be used to attach adjacent hydroponic systems together. Respective mating parts of the coupling system may be comprised by each hydroponic system. In some embodiments, respective mating parts of the coupling system may be themselves coupleable to each hydroponic system.

In other embodiments, wherein the housing 4 forms a first cavity within which to arrange a flexible fluid reservoir (not shown) and a second cavity in which to arrange the fluid table 130, each of a plurality of hydroponic systems in an array of hydroponic systems may share components, such as a fluid reservoir, that is passed into respective cavities of the hydroponic systems of the array. Further, in these embodiments, the plurality of hydroponic systems may abut or be provided in proximity to an adjacent hydroponic system of the array. It is also not essential that each of the hydroponic systems are aligned in a linear fashion as shown in FIG. 1F because the flexible fluid reservoir can adapt to the relative position of each of the hydroponic systems of the array.

Figure 1G:
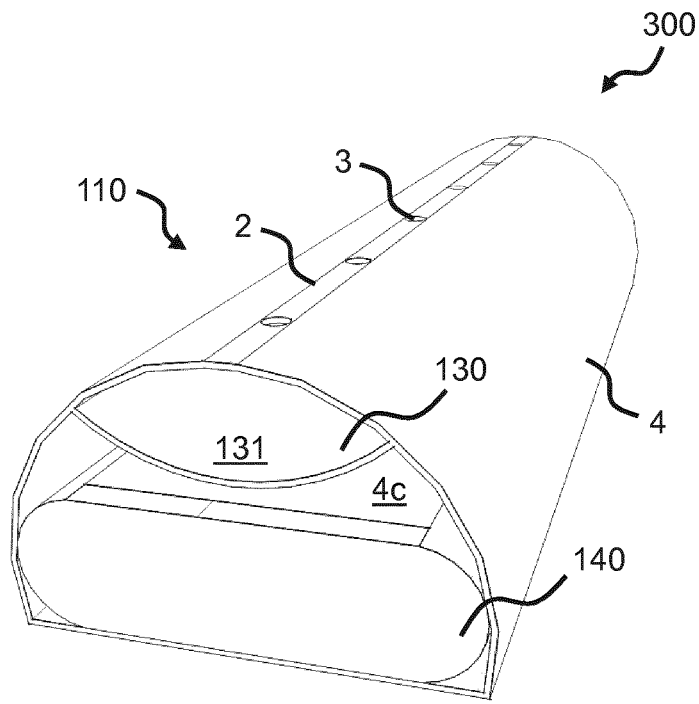

FIG. 1G illustrates a perspective view of yet another hydroponic system 300, according to some example embodiments. The hydroponic system 300 comprises a housing 4 which defines a fluid table 130 formed within the housing 4, a fluid reservoir 140 which is insertable into the housing 4, and a body 2 with a plurality of apertures 3. The body 2 is part of a grow assembly 110 which also comprises a porous layer (not shown) to wick fluid from the fluid table 130. In the embodiment shown, the body 2 is removable from the housing 4. However, in some embodiments, the body 2 may be permanently fixed to the housing 4. In other embodiments, the body 2 may be part of the housing 4 and the apertures 3 may be formed from the housing 4.

The fluid table 130 of the embodiment of FIG. 1G is different to the fluid table 130 of the embodiment to FIG. 1E in that the fluid table 130 of the hydroponic system 300 of FIG. 1G comprises an arcuate surface 131 that connects to side walls of the housing 4. In the hydroponic system 200 of FIG. 1E, the fluid table 130 comprises a flat surface with ends that extend towards and abut the body 2. Further, the fluid table 130 of the hydroponic system 200 of FIG. 1E comprises a substantially triangular cross-section, whereas the fluid table 130 of the hydroponic system 300 of FIG. 1G comprises a substantially elliptical cross-section.

The housing 4 of the hydroponic system 300 of FIG. 1G is defined by a substantially constant wall thickness. In some embodiments, the housing 4 may be formed from sheet material. A cavity 4c is shown in the hydroponic system 300 of FIG. 1G, within which the fluid reservoir 140 is disposed. The fluid reservoir 140 of the hydroponic system 300 is not arranged to entirely fill the cavity 4c so that a portion of the cavity 4c remains when the fluid reservoir 140 is inserted, as shown in FIG. 1G.

Figure 1H:
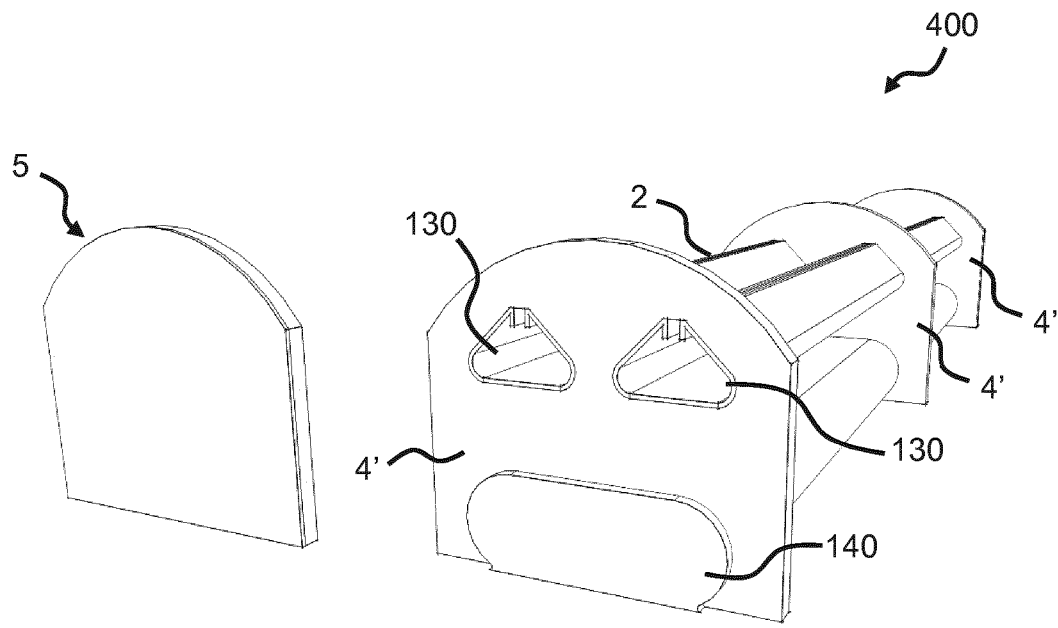

FIG. 1H illustrates a perspective view of yet another hydroponic system 400, according to some example embodiments. The hydroponic system 400 of FIG. 1H is different to the respective hydroponic systems 200, 300 of FIG. 1E and FIG. 1G in that a frame is provided. The frame comprises three individually arrangeable supports 4' that are each configured to hold two fluid tables 130 and a fluid reservoir 140. The supports 4' define stands to support a grow assembly (only a body 2 is shown). The supports 4' are moveable relative to one another. Each of the supports 4' comprises at least one first opening for receiving a fluid table 130 and a second opening for receiving a fluid reservoir 140. Two first openings are provided where there are two fluid tables 130. Each fluid table 130 has an associated body 2 with linearly arranged apertures (not shown). Therefore, two bodies 2 are shown. An end cover 5 is also shown to cover an end of each fluid table 130 and the fluid reservoir 140.

FIGS. 2A-2C and 6D describe grow tray assembly 110, as previously described in connection with FIGS. 1A-1D, in more detail.

FIG. 2A illustrates a plan view of a removable upper tray 210 of grow tray assembly 110 for a hydroponic system, according to some example embodiments, wherein the removable upper tray 210 and a lower tray form a tray assembly. Removable upper tray 210 comprises a plurality of apertures 212. Apertures 212 can be polygonal, having any number of sides. In FIG. 2A apertures 212 are shown as having a hexagonal shape. In some other embodiments, apertures 212 can be circular, ovoid, irregularly shaped, or a combination of any of the above shapes and can, in some embodiments have different sizes. In some embodiments the plurality of apertures 212 can extend along an entire surface of removable upper tray 210, while in some other embodiments, the plurality of apertures 212 can extend along only a portion of the surface of removable upper tray 210. In some embodiments, each of the plurality of apertures 212 comprises sloping, tessellated edges such that there are substantially no gaps between adjacent sloping aperture edges.

Figure 6B:
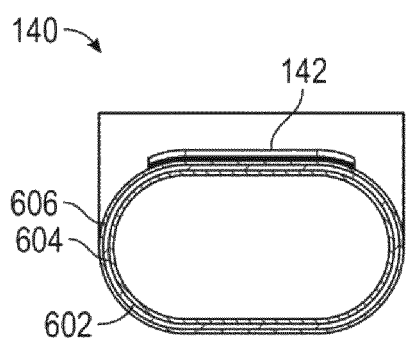
FIG. 6B illustrates a transverse cross-sectional view of the fluid reservoir of FIG. 6A taken in the plane "6B".

FIG. 6B illustrates another example of a removable upper tray 610, however, comprising a plurality of substantially rectangular-shaped apertures 612 comprising sloping, tessellated edges such that there are substantially no gaps between adjacent sloping edges. In some embodiments, a complementary lower tray can have a plurality of substantially similarly, or differently, shaped apertures.

FIG. 2B illustrates a plan view of a lower tray 220 of grow tray assembly 110 for a hydroponic system according to example embodiments. Lower tray 220 comprises a plurality of apertures 222. Lower tray 220 can further comprise a ridge 224 extending at least partially around a perimeter of lower tray 220, providing a guide for disposing removable upper tray 210 over lower tray 220. In some embodiments, apertures 222 can be substantially aligned with respective apertures 212 of removable upper tray 210 when removable upper tray 210 is properly positioned over lower tray 220. In some embodiments, the plurality of apertures 222 of lower tray 220 can have substantially the same size as the plurality of apertures 212 of removable upper tray 210. In some other embodiments, the plurality of apertures 222 of lower tray 220 can be smaller than the plurality of apertures 212 of removable upper tray 210, which can provide more support for the plants and their root systems than embodiments where the plurality of apertures 222 of lower tray 220 are substantially equal in size to the plurality of apertures 212 of removable upper tray 210.

In some embodiments, each of removable upper tray 210, 610 and lower tray 220 can comprise injected molded poly-vinyl chloride (PVC) foam or any other suitable material formed in any other suitable manner. In some embodiments, removable upper tray 210, 610 can have a substantially white colour in order to reflect a substantial amount of sunlight, thereby reducing the thermal load on and/or exposure of algae-growing light to, the roots of plants. Any other colour is also contemplated, however. Similarly, in some embodiments, lower tray 220 can have a substantially black colour in order to substantially absorb remaining light not blocked or reflected by removable upper tray 210, 610. Any other colour is also contemplated, however.

FIG. 2C illustrates an exploded perspective view of grow tray assembly 110 comprising removable upper tray 202 of FIG. 2A and lower tray 204 of FIG. 2B according to example embodiments. The lower tray 220 and the upper tray 202 form a tray assembly. Lower tray 220 is configured to receive a porous layer 230 guided by ridge 224 and removable upper tray 210 over porous layer 230 such that porous layer 230 is disposed between removable upper tray 210 and lower tray 220. Accordingly, a top side of lower tray 220, at least within the perimeter defined by ridge 224, can be substantially smooth. An underside of lower tray 220 can comprise a plurality of grooves 226 running substantially the entire length of lower tray 220 and can be configured to channel nutrient fluid from fluid table 130, 132. Accordingly, nutrient fluid can reach porous layer 230 through condensation and/or direct physical contact with the nutrient fluid flowing across fluid table 130, or utilising "plugs" of a similar porous medium (not shown) disposed within the plurality of apertures 222 and configured to wick the nutrient fluid.

Porous layer 230 can comprise a paper-based product, such as paper towel, felt, rock wool, or any other suitable material configured to support seeds dispensed into the plurality of apertures 212 of removable upper tray 210 and to wick and retain nutrient fluid from fluid table 130, 132 when grow tray assembly 110 is properly positioned within operating hydroponic system 10, 100, 102, 104, 106. In some embodiments, porous layer 230 can also be strong enough to maintain sufficient tension between its fibers that it can be removed as a single piece at the end of a growing cycle.

As will be described in more detail in connection with FIGS. 3A-4B, grow tray assembly 110, and thus at least lower tray 220, can have a first length L1 in a first dimension and a second length L2, shorter than the first length L1, in a second dimension perpendicular to the first dimension. These unequal first L1 and second L2 lengths allow grow tray assembly 110 to be positioned in hydroponic system 10, 100, 102, 104, 106 in each of a first orientation and a second orientation substantially perpendicular to the first orientation.

In the first orientation, grow tray assembly 110 is supported by the inside surfaces of respective support legs 120, 122, 170, 172, 180, 182, 190, 192 and sits either directly on or minimally spaced above fluid table 130, 132. In the second orientation, grow tray assembly 110 is supported by the upper surface of respective support legs 120, 122, 170, 172, 180, 182, 190, 192 and sits a predetermined distance "d" above fluid table 130, 132. Accordingly, plants can be grown in both an initial germination phase, corresponding to grow tray assembly 110 being positioned in the first orientation, and a subsequent growth phase, corresponding to grow tray assembly 110 being positioned in the second orientation, eliminating the need for a separate germinating table and any transplantation of individual or batches of plants between germinating and subsequent growth phases.

Moreover, grow tray assembly 110 allows fast, even application of seeds on the porous medium 230 due at least in party to the plurality of apertures 212 having tessellated edges. This arrangement further allows sufficient access to sunlight and nutrient fluid to seeds disposed on porous medium 230 and within the plurality of apertures 212, while ensuring proper seed spacing in that no seeds will be positioned in the gaps between apertures 212. In addition, the 3-layered nature of grow tray assembly 110 limits entry of light into a root zone below grow tray assembly 110, which provide further insulating properties.

Figure 3A:
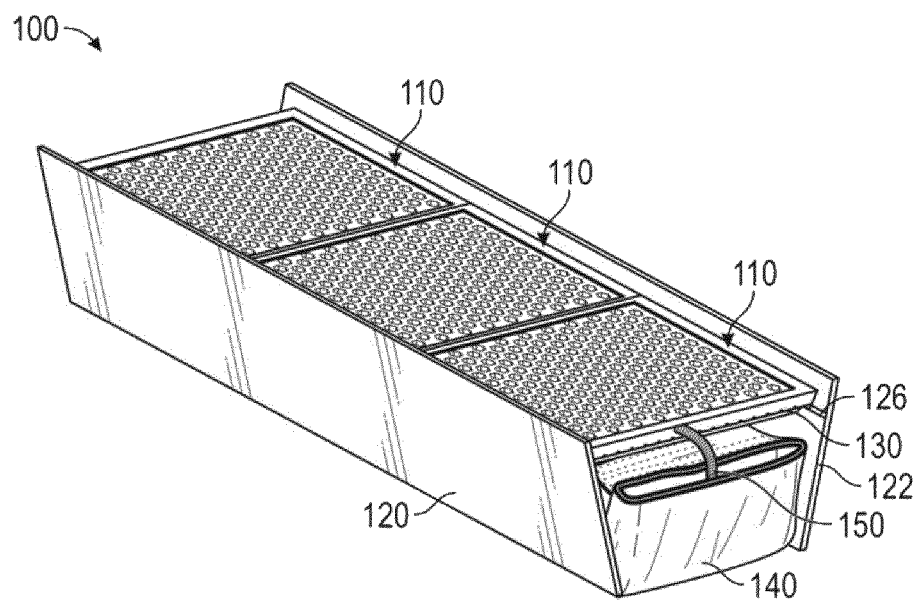
FIG. 3A illustrates a perspective view of a plurality of grow tray assemblies, as shown in FIG. 2C, disposed in a first orientation within a hydroponic system, according to example embodiments.
Figure 3B:
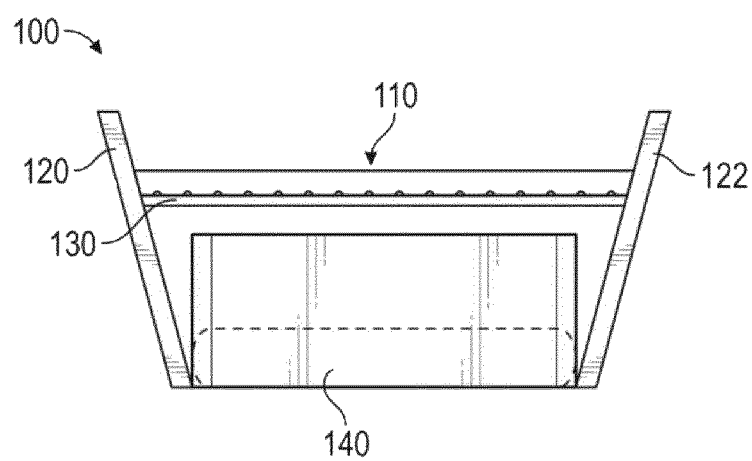
FIG. 3B illustrates an elevation view of the hydroponic system as shown in FIG. 3A.
Figure 3C:
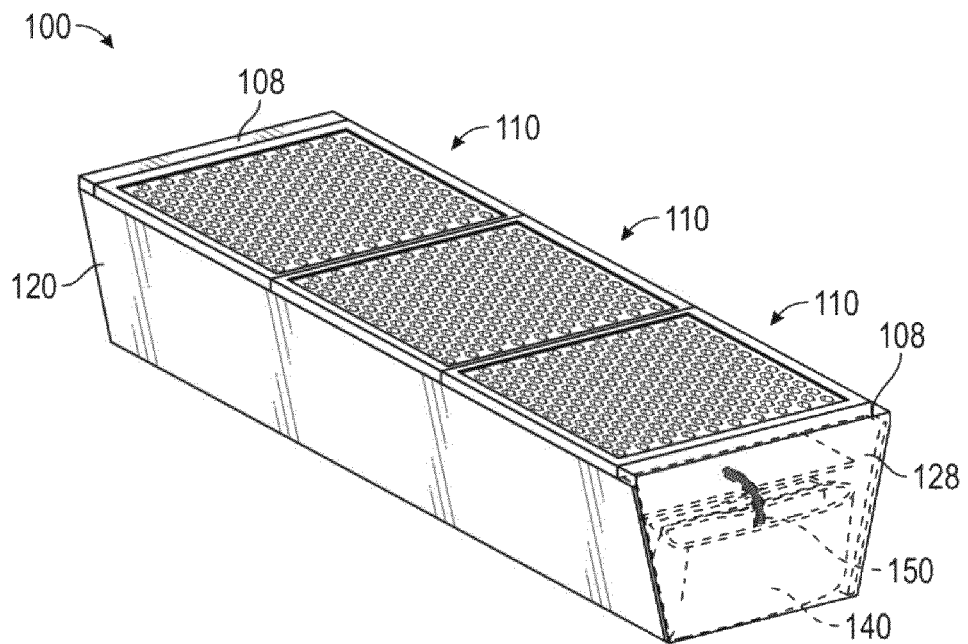
FIG. 3C illustrates a perspective view of a plurality of grow tray assemblies, as shown in FIG. 2C, disposed in a second orientation within a hydroponic system, according to example embodiments.

FIG. 3A illustrates a perspective view of a plurality of grow tray assemblies 110, as shown in FIG. 2C, disposed in a first orientation within hydroponic system 100 according to example embodiments. FIG. 3B illustrates an elevation view of hydroponic system 100 as shown in FIG. 3A. Although FIGS. 3A and 3B illustrate hydroponic system 100 of FIG. 1A, the corresponding description is equally applicable to any hydroponic system described herein, e.g., hydroponic systems 102, 104, 106.

As illustrated in FIGS. 3A and 3B, in the first orientation, grow tray assemblies 110 are positioned on or minimally spaced above fluid table 130 allowing seeds or newly sprouted seeds having relatively short roots direct exposure to the nutrient fluid, e.g., mineralised water, flowing over fluid table 130. FIG. 3A further illustrates a groove or ridge 126 on an inside surface of support legs 120, 122, which in some embodiments, support fluid table 130. In embodiments without groove or ridge 126, fluid table 130 can be directly supported by the inside surface of support legs 120, 122 due to their tapering orientations.

Figure 3D:
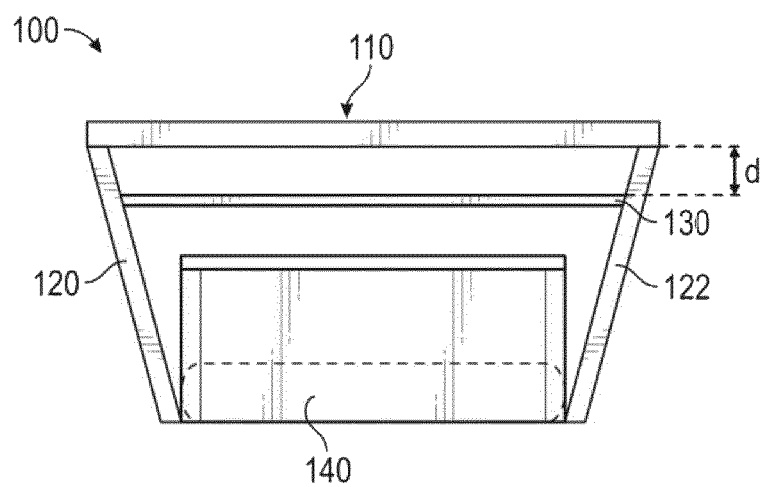
FIG. 3D illustrates an elevation view of the hydroponic system as shown in FIG. 3C.

FIG. 3C illustrates a perspective view of a plurality of grow tray assemblies 110, as shown in FIG. 2C, disposed in a second orientation within hydroponic system 100 according to example embodiments. FIG. 3D illustrates an elevation view of hydroponic system 100 as shown in FIG. 3C. Although FIGS. 3C and 3D illustrate hydroponic system 100 of FIG. 1A, the corresponding description is equally applicable to any hydroponic system described herein, e.g., hydroponic systems 102, 104, 106.

As illustrated in FIGS. 3C and 3D, in the second orientation, which is turned substantially 90° from the first orientation, grow tray assemblies 110 are positioned a predetermined distance "d" above fluid table 130 allowing seedlings, now having roots longer than in the previous germinating phase, proper exposure to the nutrient fluid, e.g., mineralised water, flowing over fluid table 130. The predetermined distance "d" can vary depending on the type of plant being grown. In this second orientation, grow tray assemblies 110 can be positioned on, and supported by, a top surface of support legs 120, 122, as previously shown in FIG. 1A.

FIG. 4A illustrates a plan view of the plurality of grow tray assemblies 110, as shown in FIG. 2C, disposed in the first orientation. FIG. 4B illustrates a plan view of the plurality of grow tray assemblies 100, as shown in FIG. 2C, disposed in the second orientation.

As shown in FIG. 4A, since grow tray assemblies 110 are disposed in the first orientation, with second length L2 extending parallel to a direction of nutrient fluid flow along fluid table 130, the plurality of grow tray assemblies 110 can fit against guide 108 on at least one side.

As shown in FIG. 4B, since grow tray assemblies 110 are disposed in the second orientation, with first length L1, which is greater than second length L2, extending parallel to the direction of nutrient fluid flow along fluid table 130, the plurality of grow tray assemblies 110 can extend a greater total length along the length of extension of hydroponic system 100 compared to when in the first orientation. Accordingly, in some embodiments, guide(s) 108 can be removed when grow tray assemblies 110 are disposed in the second orientation. However, in some embodiments removal of guide(s) 108 may not be necessary as, in the second orientation, grow tray assemblies 110 can be disposed at a vertical position that is below guide(s) 108.

FIGS. 5A and 5B further describe nutrient fluid flow in hydroponic systems 10, 100, 102, 104, 106. Although FIGS. 5A and 5B illustrate hydroponic system 100 of FIG. 1A, the associated description applies equally to any hydroponic system described herein, e.g., hydroponic systems 102, 104, 106.

FIG. 5A illustrates a cross-sectional view of a fluid flow within hydroponic system 10, 100, according to example embodiments. FIG. 5B illustrates a transverse cross-sectional view of hydroponic system 100 shown in FIG. 5A taken in the plane "6A".

Hydroponic system 100 can further include a waterproof layer 505 disposed over a top surface of fluid table 130. In some embodiments, respective ends of waterproof layer 505 can be arranged to extend down into corresponding upturned ends of fluid reservoir 140, thereby ensuring a watertight barrier for fluid table 130 and further providing a guided path for fluid to empty into one upturned end of fluid reservoir 140.

FIGS. 5A and 5B illustrate a plurality of plants 510 disposed in grow tray assemblies 110 and having respective root systems 515 extending into a space between grow tray assemblies 110 and fluid table 130.

In operation, fluid pump 500 pumps nutrient fluid 520, which can comprise mineralised water for example, out a first opening in fluid reservoir 140, through fluid riser 150, onto the first side of fluid table 130. In some embodiments, the first side of fluid table 130, where fluid riser 150 expels water, can be the vertically highest point on fluid table 130.

Fluid 520 can spread across fluid table 130 through various means, for example, holes in a terminal portion of fluid riser 150, grooves formed in a proximal portion of fluid table 130, or placement of stones configured to laterally divert portions of fluid 520. As fluid 520 spreads across fluid table 130 it also flows in the direction of the arrows along fluid table 130, forming a flowing nutrient fluid layer 525 on fluid table 130. The thickness or depth of flowing nutrient fluid layer 525 can be adjusted by modulating the flow rate of fluid pump 500 and/or based on a sloping angle of fluid table 130.

At the second side of fluid table 130, opposite the first side, fluid of flowing nutrient fluid layer 525 flows off fluid table 130 and into a second opening of fluid reservoir 140 without the need for any return plumbing. This second side of fluid table 130 can be the vertically lowest point on fluid table 130. Although not shown, in some embodiments, a spongy material can be disposed in the second opening of fluid reservoir 140, thereby filtering nutrient fluid 520 and reducing wear on fluid pump 500.

Due to substantially equal gravity and atmospheric pressure on the entirety of a surface of fluid 520 within fluid reservoir 140, a level of fluid 520 is substantially maintained across fluid reservoir 140. Accordingly, as fluid 520 falls back into fluid reservoir 140, fluid 520 is naturally forced through fluid reservoir 140 in the direction of the arrows, setting up a natural convection current, which ensures continual circulation of fluid 520 and also reduces algae growth.

Fluid reservoir 140, as utilised by the hydroponic systems described herein, will now be described in more detail in connection with FIGS. 6A-6C.

FIG. 6A illustrates a cross-sectional view of fluid reservoir 140 having ends disposed in a substantially vertical orientation, according to example embodiments. FIG. 6B illustrates another cross-sectional view of fluid reservoir 140 taken in plane "6B" of FIG. 6A. Fluid reservoir 140 can comprise a waterproof liner 602, which can be filled with nutrient fluid. Utilising waterproof liner 602 provides simple system cleaning, since waterproof liner 602 can be replaced in less than 5 minutes, further encouraging regular system maintenance. In some embodiments, waterproof liner 602 can comprise plastic or any other suitable waterproof material.

Fluid reservoir 140 can further comprise an insulating layer 604 disposed around an outside of fluid reservoir 140. In some embodiments, insulating layer 604 can be black in colour and/or can be opaque to visible light and/or any wavelength of electromagnetic radiation that can stimulate algae or other plant growth within fluid reservoir 140, thereby substantially reducing or eliminating such growth. In some embodiments, insulating layer 604 can further have heat insulating properties such that the fluid in fluid reservoir 140 is held within a desired temperature range despite the outside environment being outside that range. Accordingly, insulating layer 604 can comprise a fabric such as neoprene, an open or closed-cell foam, such as expanded polyethylene (EPE) foam with or without double-sided aluminum XPE foil, and/or any other suitable material having sufficient light-blocking and/or thermal insulating properties. In some embodiments, insulating layer 604 can be selected from a plurality of insulating layers each having a different thickness and/or thermal insulating properties according to the requirements of the particular plants to be grown and/or the particular environmental conditions.

Fluid reservoir 140 can further comprise a reservoir jacket 606 comprising a fabric or cloth material and configured to enclose insulating layer 604 and waterproof liner 602, as will be described in more detail in connection with FIG. 6C below.

Figure 6C:
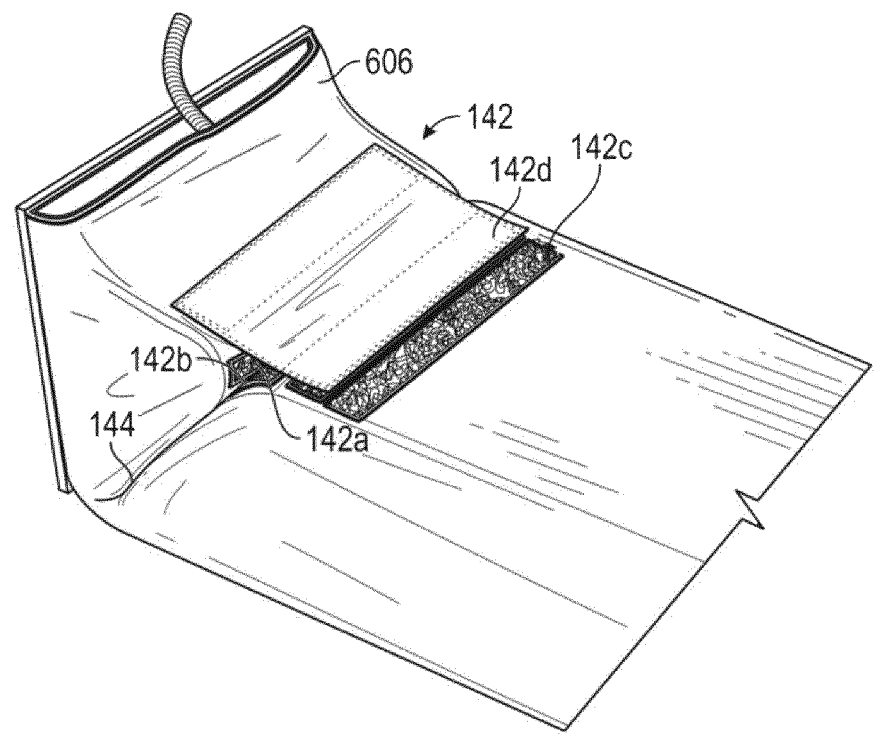
FIG. 6C illustrates a perspective view of a portion of the fluid reservoir of FIGS. 6A and 6B.
Figure 6D:
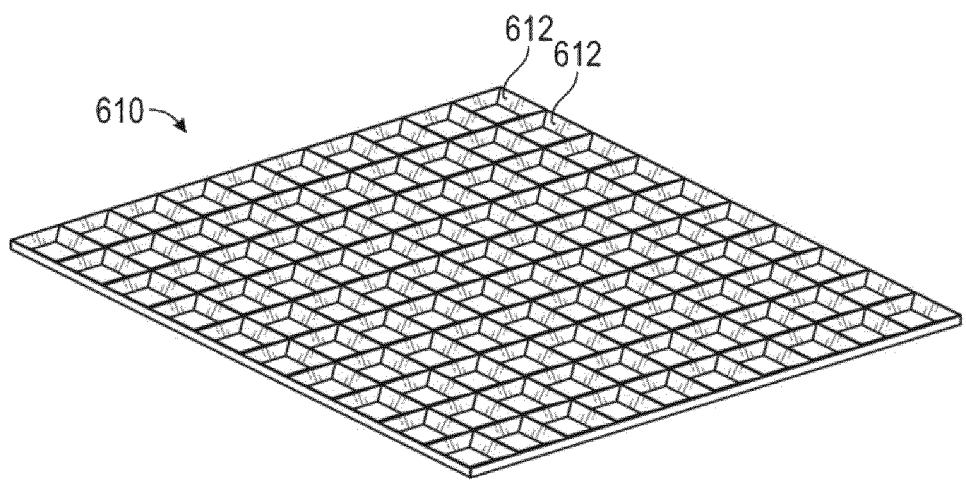
FIG. 6D illustrates a perspective view of another removable upper tray of a hydroponic system, according to some example embodiments.

FIG. 6C illustrates a perspective view of a portion of fluid reservoir 140 of FIGS. 6A and 6B. FIG. 6C illustrates reservoir jacket 606, of fluid reservoir 140, having fastener 142, which can be a hook- and loop type fastener such as Velcro®, or any other suitable type of fastener. In some embodiments, one or more hook or loop type patches or strips can be adhered and/or secured to portions of reservoir jacket 606 such that when an opening at the end of fluid reservoir 140 is turned up, as previously described, a complementary loop or hook type patch aligns with the one or more hook or loop type patches, thereby maintaining the opening at the end of fluid reservoir 140 in the upturned orientation.

For example, a first patch 142*a* can be secured to an upper portion of one side of crease 144 in reservoir jacket 606 and a second patch 142*b*, complementary to first patch 142*a*, can be secured to an upper portion of a second side of crease 144 such that, when the opening at the end of fluid reservoir 140 is in the upturned orientation, first patch 142a and second patch 142b are substantially aligned and secured to one another. A third patch 142c can be secured to a portion of reservoir jacket 606 medial to crease 144 and a fourth patch 142d. complementary to third patch 142c, can be secured to a portion of reservoir jacket 606 lateral to crease 144 and extend across crease 144 such that, when the opening at the end of fluid reservoir 140 is in the upturned orientation, third patch 142c and fourth patch 142d are substantially aligned and secured to one another. However, any other method of securing the ends of fluid reservoir 140 in the above-described upturned position is also contemplated.

The hydroponic systems 10, 100, 102, 104, 106, 200, 300, 400 described in this disclosure offer many advantages over systems currently available. For example, hydroponic systems 10, 100, 102, 104, 106, 200, 300, 400 have far fewer parts, not requiring any plumbing other than fluid riser 150. Accordingly, hydroponic systems 10, 100, 102, 104, 106, 200, 300, 400 are simpler to set up and easier to maintain. This ease of maintenance, as well as utilisation of light-blocking materials in the construction of one or both of insulating layer 604 and fluid reservoir 140 prevents algae growth.

In addition, since fluid reservoir 140 is flexible and collapsible, it can be folded flat and/or rolled up into a very compact space for storage and/or shipping. The use of such a flexible and collapsible fluid reservoir 140, especially as placed directly underneath fluid table 130, 132 eliminates a need for separately spaced, rigid, bulky fluid reservoirs and growing tables.

Hydroponic systems 10, 100, 102, 104, 106, 200, 300, 400 are also modular and scalable such that multiple hydroponic systems 10, 100, 102, 104, 106, 200, 300, 400 can be arranged in series. For example, multiple hydroponic systems 10, 100, 102, 104, 106, 200, 300, 400 can have adjacent fluid tables 130, 132 and adjacent fluid reservoirs 140 aligned at their meeting edges. A waterproof liner, similar to waterproof liner 602, but having a length extending along an entirety of the multiple hydroponic systems 10, 100, 102, 104, 106, 200, 300, 400 can be disposed within series-coupled reservoir jackets 606 and an opening at one end of fluid reservoir 140 of a first hydroponic system 10, 100, 102, 104, 106, 200, 300, 400 and an opening at an opposite end of a fluid reservoir 140 of a last hydroponic system 10, 100, 102, 104, 106, 200, 300, 400 in the series can be disposed in the previously-described upturned orientation. Similarly, a waterproof layer, such as waterproof layer 505, but having a length extending along an entirety of the multiple hydroponic systems 10, 100, 102, 104, 106, 200, 300, 400 can be disposed over a top surface of each fluid table 130, 132 with respective ends arranged to extend down into corresponding upturned ends of the series-combined fluid reservoir 140. Accordingly, a single fluid pump can be utilised to pump nutrient fluid onto a first end of the first fluid table 130, 132 forming flowing nutrient fluid layer 525 along a top surface of each fluid table 130, 132 of the multiple hydroponic systems 10, 100, 102, 104, 106, 200, 300, 400 which ultimately falls into the upturned opening at the opposite end of combined fluid reservoirs 140, recycling the nutrient fluid. Such a modular, compact design minimises the energy required to pump the water up to fluid table 130, 132, hence requiring only a small, energy efficient pump, and making hydroponic systems 10, 100, 102, 104, 106, 200, 300, 400 highly energy efficient.

Figure 7:
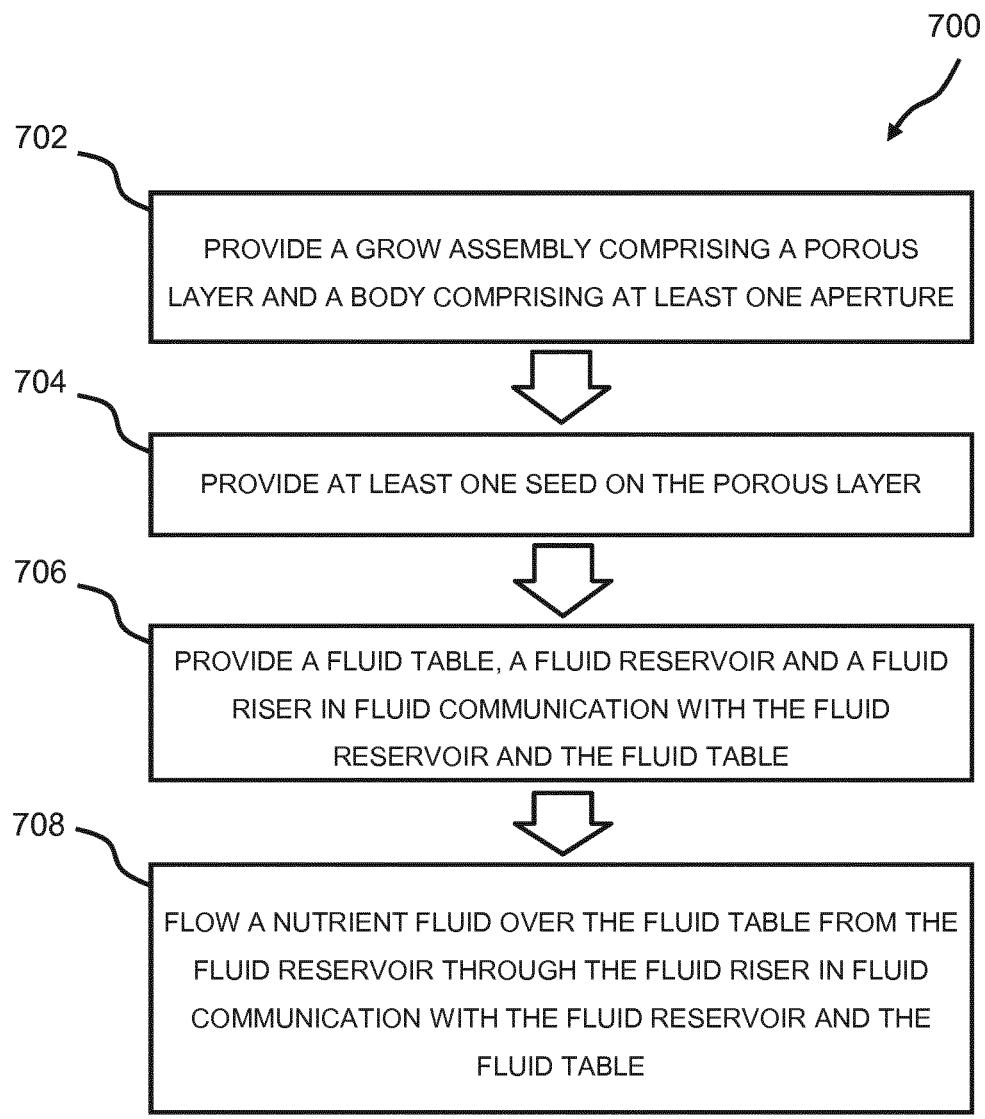
FIGS. 7 and 7A respectively illustrate a flowchart of a method for utilising a hydroponic system as described herein, according to some example embodiments.

An example method for utilising a hydroponic system, such as the hydroponic systems 10, 102, 104, 106, 200, 300, 400 as previously discussed, will now be described in connection with FIG. 7. Flowchart 700, as well as any associated method, can correspond to any description relating to any portion of hydroponic systems 10, 100, 102, 104, 106, 200, 300, 400. In some embodiments, a method can comprise one or more additional steps, can omit one or more described steps, and/or can include performing one or more steps in a different order than described herein.

At block 702, a grow assembly is provided comprising a porous layer and a body comprising at least one aperture.

At block 704, at least one seed is provided on the porous layer.

At block 706, a fluid table, a fluid reservoir, and a fluid riser in communication with fluid reservoir and the fluid table, are provided. The providing a fluid table may comprise disposing the fluid table underneath the porous layer. The providing a reservoir may comprise disposing the fluid reservoir underneath the fluid table. The providing a grow assembly may comprise disposing the grow assembly on the fluid table of the hydroponic system.

At block 708, a nutrient fluid is flowed over the fluid table from the fluid reservoir through the fluid riser in fluid communication with the fluid reservoir and the fluid table.

At block 710 (not shown), the grow assembly is optionally supported by a support of the hydroponic system.

Figure 7A:
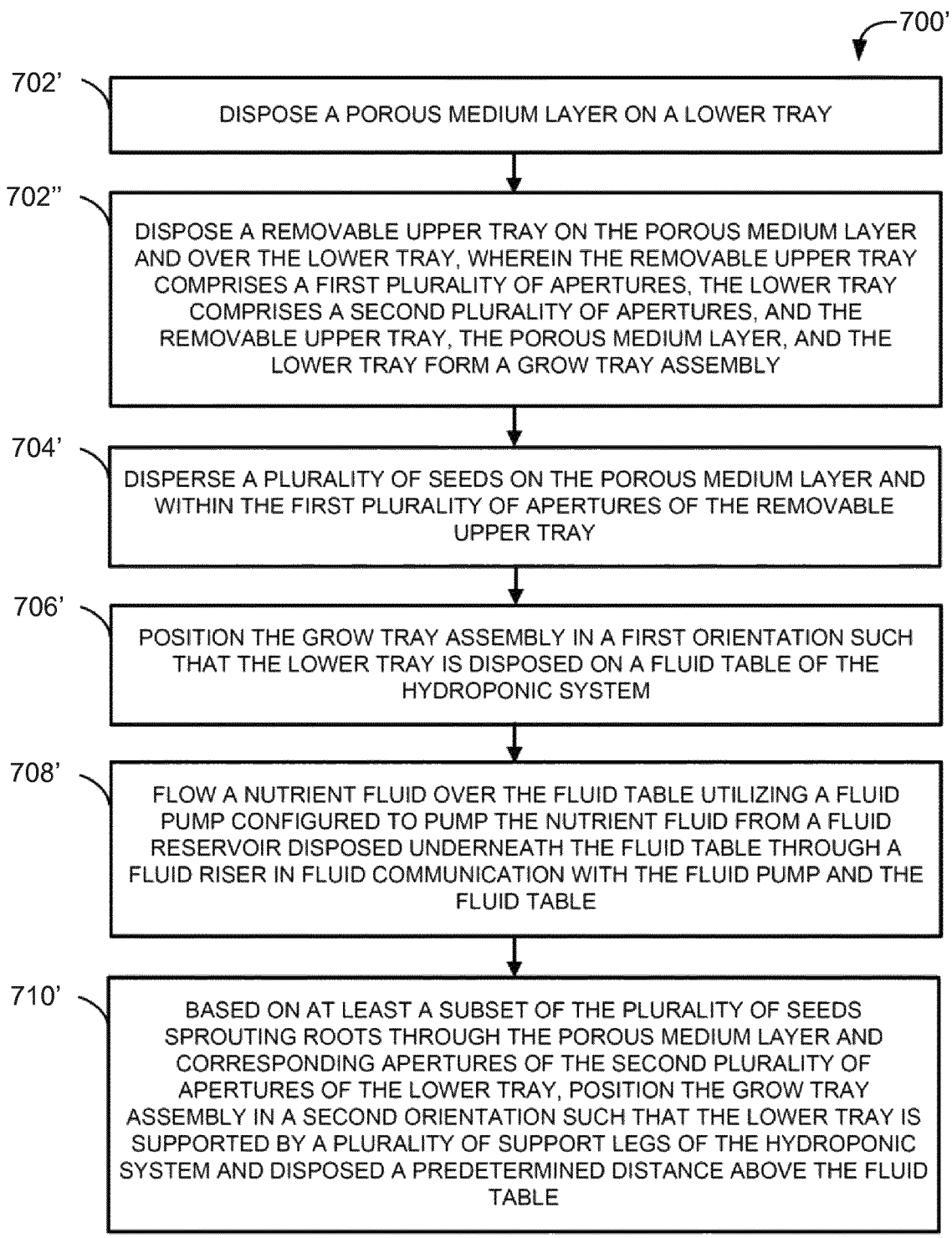

A further example method for utilising any of hydroponic systems 10, 100, 102, 104, 106 will now be described in connection with FIG. 7A. Flowchart 700', as well as any associated method, can correspond to any description relating to any portion of hydroponic systems 10, 100, 102, 104, 106. In some embodiments, a method can comprise one or more additional steps, can omit one or more described steps, and/or can include performing one or more steps in a different order than described herein.

The body may be in the form of a tray assembly, so that the combination of the body and the porous layer form a grow tray assembly. Therefore, at block 702', a porous layer is disposed on a lower tray of the grow tray assembly. For example, as previously described in connection with at least FIGS. 2A-2C, porous layer 230 is disposed on lower tray 220. Block 702' may be a sub-block of block 702 of FIG. 7.

At block 702", a removable upper tray of the grow tray assembly is disposed on the porous layer and over the lower tray. For example, as previously described in connection with at least FIGS. 2A-2C, removable upper tray 210 is disposed on porous layer 230 and over lower tray 220. Removable upper tray 210 comprises a first plurality of apertures 212. Lower tray 220 comprises a second plurality of apertures 222. Removable upper tray 210, porous layer 230, and lower tray 220 form grow tray assembly 110, as previously described in connection with at least FIGS. 1A-2C. Block 702" may also be a sub-block of block 702 of FIG. 7.

At block 704', a plurality of seeds are dispersed on the porous layer and within the first plurality of apertures of the removable upper tray. For example, a plurality of seeds can be sprinkled uniformly across the top face of grow tray assembly 110 when assembled. The sloping, tessellated edges of the first plurality of apertures 212 allow the user to, for example, pass his or her hand across removable upper tray 210 after sprinkling the seeds causing the seeds to naturally fall to porous layer 230 exposed within the first plurality of apertures 212. Such an arrangement allows the seeds to be rapidly and evenly distributed across removable upper tray 210. Block 704' may be a sub-block of block 704 of FIG. 7.

At block 706', the grow tray assembly is positioned in a first orientation such that the lower tray is disposed on a fluid table of the hydroponic system. For example, as previously described in connection with at least FIGS. 1, 1A-1D and 3A-4B, grow tray assembly 110, and thus at least lower tray 220, have a first length in a first dimension and a second length, shorter than the first length, in a second dimension substantially perpendicular to the first dimension. In a first orientation, where the second length extends substantially perpendicular to the direction of nutrient fluid flow across fluid table 130, 132, grow tray assembly 110 can be disposed on fluid table 130, 132. Accordingly, in some embodiments, the second length L2 of grow tray assembly 110 can be substantially equal to or less than the width of fluid table 130, 132, thereby allowing grow tray assembly 110 to fit between the inside surfaces of support legs 120, 122, 170, 172, 180, 182, 190, 192. This can correspond to a germination phase. Block 706' may be a sub-block of block 706 of FIG. 7.

At block 708', a nutrient fluid is flowed over the fluid table utilising a fluid pump configured to pump the nutrient fluid from a fluid reservoir disposed underneath the fluid table through a fluid riser in fluid communication with an optional fluid pump and the fluid table. For example, as previously described in connection with at least FIGS. 1, 1A-1D, 3A-3D, and 5A-5B, fluid pump 500 pumps nutrient fluid 520 from fluid reservoir 140, disposed underneath fluid table 130, 132, through fluid riser 150, onto a first side of fluid table 130, 132. As nutrient fluid 520 spreads out across fluid table 130, 132 it forms flowing nutrient fluid layer 525, the height or depth of which can be controlled by either or both of the angle of fluid table 130, 132 and the flow rate of fluid pump 500. Nutrient fluid 520 then flows off a second side of fluid table 130, 132 opposite the first side back into fluid reservoir 140, where it is recycled. Block 708' may be a sub-block of block 708 of FIG. 7.

At block 710', based on at least a subset of the plurality of seeds sprouting roots through the porous layer and corresponding apertures of the second plurality of apertures of the lower tray, the grow tray assembly is positioned in a second orientation such that the lower tray is supported by a plurality of support legs of the hydroponic system and disposed a predetermined distance above the fluid table. For example, as previously described in connection with FIGS. 3C-5B, once the seeds have germinated and their water shoots, e.g., roots, have penetrated porous layer 230, grow tray assembly 110 can be rotated 90 degrees, such that lower tray 220 is supported by a support, such as support legs 120, 122, 170, 172, 180, 182, 190, 192, in some embodiments by an upper edge or surface of the support legs. In the second orientation, the first length, which is longer than the second length, of grow tray assembly 110 is positioned perpendicular to the flow of nutrient fluid across fluid table 130. In this second orientation, grow tray assembly 110 sits higher up in the hydroponic system, thereby allowing the roots 515 the space they need to grow and mature as the plants grow. Block 710' may be a sub-block of block 710 (not shown in FIG. 7).

As previously described, fluid reservoir 140 can be flexible, and collapsible when not filled with nutrient fluid 520. In some embodiments, a method for utilising any of hydroponic systems 10, 100, 102, 104, 106, 200, 300, 400 can further comprise filling fluid reservoir 140 with a nutrient fluid thereby expanding fluid reservoir 140.

As previously described, fluid reservoir 140 can comprise reservoir jacket 606 comprising at least one fastener 142. In some embodiments, a method for utilising any of hydroponic systems 10, 100, 102, 104, 106 can further comprise securing a respective opening at each end of fluid reservoir 140 in an upturned orientation utilising the at least one fastener 142.

As previously described, hydroponic systems 10, 100, 102, 104, 106, 200, 300, 400 can further comprise reservoir 140 can comprise waterproof layer 505 on fluid table 130, 132. In some embodiments, a method for utilising any of hydroponic systems 10, 100, 102, 104, 106, 200, 300, 400 can further comprise disposing waterproof layer 505 on fluid table 130, 132 and disposing each respective end of waterproof layer 505 in the respective opening at each end of fluid reservoir 140.

As previously described, a depth of a layer 525 of nutrient fluid 520 on fluid table 130,132 can be controlled by adjusting one or both of an angle of fluid table 130,132 and a flow rate of fluid pump 500.

As previously described, the plurality of support legs 120, 122, 170, 172, 180, 182, 190, 192 can be configured to fold substantially flat beneath grow tray assembly 110 when storing or transporting hydroponic systems 10, 100, 102, 104, 106. Accordingly, some embodiments of a method for utilising any of hydroponic systems 100, 102, 104, 106 can further comprise folding the plurality of support legs 120, 122, 170, 172, 180, 182, 190, 192 substantially flat beneath grow tray assembly 110 when storing or transporting hydroponic systems 10, 100, 102, 104, 106.

As previously described, insulating layer 604 can be selected from a plurality of insulating layers each having a different thickness and/or thermal insulating properties according to the requirements of the particular plants to be grown and/or the particular environmental conditions. Accordingly, some embodiments of a method for utilising any of hydroponic systems 10, 100, 102, 104, 106, 200, 300, 400 can further comprise selecting insulating layer 604 of fluid reservoir 140 based at least in part on conditions of an external environment, insulating layer 604 being substantially opaque to visible light.

What is claimed is:

1. A hydroponic system, comprising:
   a grow assembly comprising:
      a body in the form of a tray assembly comprising:
         a removable upper tray comprising a first plurality of apertures, the first plurality of apertures comprising sloping tessellated edges configured to guide seeds within the first plurality of apertures onto a porous layer disposed between the removable upper tray and a lower tray, the lower tray comprising a second plurality of apertures and a support;
            wherein, the support is a plurality of support legs configured to fold substantially flat beneath the grow assembly;
            wherein, at least the lower tray has a first length in a first dimension and a second length, shorter than the first length, in a second dimension perpendicular to the first dimension; and
      a fluid table disposed beneath the porous layer and the lower tray;
         wherein the grow assembly is configured to rest on the fluid table when positioned in a first orientation corresponding to the second length extending substantially perpendicular to a direction of flow of a nutrient fluid across the fluid table,
         wherein the grow assembly is further configured to rest on the plurality of support legs, a predetermined distance above the fluid table, when positioned in a second orientation corresponding to the first length extending substantially perpendicular to the direction of flow of the nutrient fluid across the fluid table;
wherein each leg of the plurality of support legs comprises a first portion configured to support the grow assembly when the grow assembly is positioned in one of two perpendicular orientations, a second portion configured to support the fluid table and coupled to the first portion by a hinge, and one of a groove or a ridge configured to support a respective edge of the fluid table;
a support element extending between, and perpendicular to, the plurality of support legs, and configured to support the fluid table and prevent the plurality of support legs from folding inward when supported by the groove or the ridge;
a fluid reservoir disposed beneath the fluid table and comprising a waterproof liner, an insulating layer at least partially encapsulating the waterproof liner, and a reservoir jacket comprising at least one fastener configured to secure a respective opening at each end of the fluid reservoir in an upturned orientation;
wherein, the insulating layer is substantially opaque to visible light;
wherein the fluid reservoir, when at least partially filled with the nutrient fluid, physically contacts at least one of the first portion, the second portion and the hinge, thereby preventing the plurality of support legs from collapsing; and
a fluid riser in fluid communication with the fluid reservoir and the fluid table.

2. A hydroponic system comprising:
a grow assembly comprising:
a body in the form of a tray assembly comprising:
a removable upper tray comprising a first plurality of apertures, the first plurality of apertures comprising sloping tessellated edges configured to guide seeds within the first plurality of apertures onto a porous layer disposed between the removable upper tray and a lower tray, the lower tray comprising a second plurality of apertures and a support;
wherein, the support is a plurality of support legs configured to fold substantially flat beneath the grow assembly;
wherein, at least the lower tray has a first length in a first dimension and a second length, shorter than the first length, in a second dimension perpendicular to the first dimension; and
a fluid table disposed beneath the porous layer and the lower tray;
wherein the grow assembly is configured to rest on the fluid table when positioned in a first orientation corresponding to the second length extending substantially perpendicular to a direction of flow of a nutrient fluid across the fluid table,
wherein the grow assembly is further configured to rest on the plurality of support legs, a predetermined distance above the fluid table, when positioned in a second orientation corresponding to the first length extending substantially perpendicular to the direction of flow of the nutrient fluid across the fluid table;
wherein each leg of the plurality of support legs comprises a first portion configured to support the grow assembly when the grow assembly is positioned in one of two perpendicular orientations, a second portion configured to support the fluid table and coupled to the first portion by a hinge, and one of a groove or a ridge configured to support a respective edge of the fluid table;
a support element extending between, and perpendicular to, the plurality of support legs, and configured to support the fluid table and prevent the plurality of support legs from folding inward when supported by the groove or the ridge;
a fluid reservoir disposed beneath the fluid table and comprising a waterproof liner, an insulating layer at least partially encapsulating the waterproof liner, and a reservoir jacket comprising at least one fastener configured to secure a respective opening at each end of the fluid reservoir in an upturned orientation;
wherein, the insulating layer is substantially opaque to visible light
wherein the fluid reservoir, when at least partially filled with the nutrient fluid, physically contacts at least one of the first portion, the second portion and the hinge, thereby preventing the plurality of support legs from collapsing;
a fluid riser in fluid communication with the fluid reservoir and the fluid table;
wherein the fluid reservoir is:
flexible, and collapsible when not filled with the nutrient fluid; and
comprises a first orifice and a second orifice, each disposed on an upper surface of fluid reservoir, the fluid riser configured to pass through the first orifice, and the second orifice configured to provide drainage for the nutrient fluid to flow from the fluid table into the fluid reservoir,
comprises an opening at an end of the fluid reservoir disposed underneath a drainage side of the fluid table;
the fluid riser is configured to pass through the opening and extend to a side of the fluid table opposite the drainage side such that the nutrient fluid flows from the fluid reservoir, through the fluid riser, across the fluid table, and drains into the opening; and
the fluid table comprises a first side and a second side, the first side inclined relative to the second side.

3. A hydroponic system, comprising:
a grow assembly comprising:
a body in the form of a tray assembly comprising:
a removable upper tray comprising a first plurality of apertures, the first plurality of apertures comprising sloping tessellated edges configured to guide seeds within the first plurality of apertures onto a porous layer disposed between the removable upper tray and a lower tray, the lower tray comprising a second plurality of apertures and a support;
wherein, the support is a plurality of support legs configured to fold substantially flat beneath the grow assembly;
wherein, at least the lower tray has a first length in a first dimension and a second length, shorter than the first length, in a second dimension perpendicular to the first dimension; and
a fluid table disposed beneath the porous layer and the lower tray;
wherein the grow assembly is configured to rest on the fluid table when positioned in a first orientation corresponding to the second length extending substantially perpendicular to a direction of flow of a nutrient fluid across the fluid table, wherein the grow assembly is further configured to rest on the plurality of support legs, a predetermined distance above the fluid table, when positioned in a second orientation corresponding to the first length extending substantially perpendicular to the direction of flow of the nutrient fluid across the fluid table;

wherein each leg of the plurality of support legs comprises a first portion configured to support the grow assembly when the grow assembly is positioned in one of two perpendicular orientations, a second portion configured to support the fluid table and coupled to the first portion by a hinge, and one of a groove or a ridge configured to support a respective edge of the fluid table;

a support element extending between, and perpendicular to, the plurality of support legs, and configured to support the fluid table and prevent the plurality of support legs from folding inward when supported by the groove or the ridge;

a fluid reservoir disposed beneath the fluid table and comprising a waterproof liner, an insulating layer at least partially encapsulating the waterproof liner, and a reservoir jacket comprising at least one fastener configured to secure a respective opening at each end of the fluid reservoir in an upturned orientation;

wherein, the insulating layer is substantially opaque to visible light;

wherein the fluid reservoir, when at least partially filled with the nutrient fluid, physically contacts at least one of the first portion, the second portion and the hinge, thereby preventing the plurality of support legs from collapsing;

a fluid riser in fluid communication with the fluid reservoir and the fluid table;

wherein the fluid reservoir is:
  flexible, and collapsible when not filled with the nutrient fluid; and
  comprises a first orifice and a second orifice, each disposed on an upper surface of fluid reservoir, the fluid riser configured to pass through the first orifice, and the second orifice configured to provide drainage for the nutrient fluid to flow from the fluid table into the fluid reservoir,
  comprises an opening at an end of the fluid reservoir disposed underneath a drainage side of the fluid table;

the fluid riser is configured to pass through the opening and extend to a side of the fluid table opposite the drainage side such that the nutrient fluid flows from the fluid reservoir, through the fluid riser, across the fluid table, and drains into the opening;

the fluid table comprises a first side and a second side, the first side inclined relative to the second side;

wherein the fluid reservoir further comprises a respective opening at each of two upturned ends, the hydroponic system further comprising a waterproof layer disposed on the fluid table and having respective ends each disposed in a respective opening;

further comprising a fluid pump in fluid communication with the fluid reservoir, wherein the fluid riser is in fluid communication with the fluid pump and the fluid table;

the fluid pump is configured to pump the nutrient fluid from the fluid reservoir, through the fluid riser, and onto the fluid table, thereby forming a flowing nutrient fluid layer on the fluid table; and a depth of the flowing nutrient fluid layer on the fluid table is controllable by adjusting one or both of an angle of the fluid table and a flow rate of the fluid pump.

4. A method for utilizing a hydroponic system, comprising:
  providing the hydroponic system of claim 1;
  wherein the fluid riser is in fluid communication with the fluid reservoir and the fluid table; and
  flowing nutrient fluid over the fluid table from the fluid reservoir through the fluid riser in fluid communication with the fluid reservoir and the fluid table.

5. The method of claim 4:
  wherein the step of providing the fluid table comprises disposing the fluid table underneath the porous layer;
  wherein the step of providing the reservoir comprises disposing the fluid reservoir underneath the fluid table;
  wherein the step of providing the grow assembly comprises disposing the grow assembly on the fluid table of the hydroponic system;
  wherein the step of providing the grow assembly comprises disposing the porous layer on the lower tray and disposing the removable upper tray on the porous layer and over the lower tray;
  wherein the step of providing at least one seed comprises dispersing a plurality of seeds on the porous layer and within the first plurality of apertures of the removable upper tray; and
  wherein the step of providing the grow assembly comprises positioning the grow assembly in a first orientation such that the lower tray is disposed on a fluid table of the hydroponic system.

6. The method of claim 5, comprising supporting the grow assembly with the support; wherein the step of supporting the grow assembly comprises: based on at least a subset of the plurality of seeds sprouting roots through the porous layer and corresponding apertures of the second plurality of apertures of the lower tray, positioning the grow assembly in a second orientation, perpendicular to the first orientation, such that the lower tray is supported by the support of the hydroponic system and disposed a predetermined distance above the fluid table.

7. The method of claim 6, wherein the step of supporting the lower tray comprises supporting by the plurality of support legs which form the support.

8. The method of claim 7, further comprising folding the plurality of support legs substantially flat beneath the grow assembly when storing or transporting the hydroponic system.

9. The method of claim 8, further comprising the first plurality of apertures of the removable upper tray comprise sloping tessellated edges configured to guide seeds onto the porous layer and within the first plurality of apertures.

10. The method of claim 9, further comprising at least the lower tray of the grow assembly that has a first length in a first dimension and a second length, shorter than the first length, in a second dimension substantially perpendicular to the first dimension.

11. The method of claim 10, wherein:
  the first orientation corresponds to the second length extending substantially perpendicular to a direction of flow of the nutrient fluid over the fluid table;
  the second orientation corresponds to the first length extending substantially perpendicular to the direction of flow of the nutrient fluid over the fluid table;
  the fluid reservoir is flexible, and collapsible when not filled with the nutrient fluid, the method further comprising filling the fluid reservoir with a nutrient fluid thereby expanding the fluid reservoir;

the fluid reservoir comprises a reservoir jacket comprising at least one fastener, the method further comprising securing a respective opening at each end of the fluid reservoir in an upturned orientation utilizing the at least one fastener.

12. The method of claim 11, further comprising disposing a waterproof layer on the fluid table and disposing each respective end of the waterproof layer in the respective opening at each end of the fluid reservoir.

13. The method of claim 12, wherein the step of flowing the nutrient fluid comprises flowing the nutrient fluid over the fluid table utilizing the fluid pump configured to pump the nutrient fluid from a fluid reservoir disposed underneath the fluid table through the fluid riser in fluid communication with the fluid pump and the fluid table.

14. The method of claim 13, further comprising controlling a depth of a layer of the nutrient fluid on the fluid table by adjusting one or both of an angle of the fluid table and a flow rate of the fluid pump; and selecting an insulating layer of the fluid reservoir based at least in part on conditions of an external environment, the insulating layer being substantially opaque to visible light.

* * * * *